US011535323B2

(12) United States Patent
Shirai et al.

(10) Patent No.: US 11,535,323 B2
(45) Date of Patent: Dec. 27, 2022

(54) TELESCOPIC APPARATUS FOR HUMAN-POWERED VEHICLE, HEIGHT ADJUSTABLE SEATPOST, AND BICYCLE COMPONENT CONTROL SYSTEM

(71) Applicant: SHIMANO INC., Sakai (JP)

(72) Inventors: Toyoto Shirai, Sakai (JP); Yuki Sakagawa, Sakai (JP); Yoshimitsu Miki, Sakai (JP); Norikazu Taki, Sakai (JP)

(73) Assignee: SHIMANO INC., Sakai (JP)

( * ) Notice: Subject to any disclaimer, the term of this patent is extended or adjusted under 35 U.S.C. 154(b) by 544 days.

(21) Appl. No.: 15/983,101

(22) Filed: May 18, 2018

(65) Prior Publication Data

US 2019/0351966 A1 Nov. 21, 2019

(51) Int. Cl.
*B62J 1/08* (2006.01)
*B62K 25/04* (2006.01)
*B62J 50/20* (2020.01)
*B62K 25/08* (2006.01)
*B62J 45/41* (2020.01)
*B62J 45/42* (2020.01)
*B62J 45/20* (2020.01)

(52) U.S. Cl.
CPC ............... *B62J 1/08* (2013.01); *B62J 45/20* (2020.02); *B62J 50/20* (2020.02); *B62K 25/04* (2013.01); *B62J 45/41* (2020.02); *B62J 45/42* (2020.02); *B62J 2001/085* (2013.01); *B62K 25/08* (2013.01)

(58) Field of Classification Search
CPC ........ B62K 23/02; B62K 25/04; B62K 25/06; B62K 25/08; B62K 25/10; B62K 2025/044; B62K 2025/045; B62J 1/08; B62J 45/20; B62J 45/40; B62J 45/41; B62J 2001/085
See application file for complete search history.

(56) References Cited

U.S. PATENT DOCUMENTS

| 7,733,239 | B2 * | 6/2010 | Nordmeyer | ............ B60G 11/27 342/125 |
| 7,956,797 | B2 * | 6/2011 | Talty | .................... B60G 17/019 342/118 |
| 8,016,349 | B2 * | 9/2011 | Mouri | .................... B62K 19/36 297/215.13 |
| 8,692,706 | B2 * | 4/2014 | Hecker | ............ B60G 17/01933 342/70 |
| 9,511,809 | B2 * | 12/2016 | Kodama | ..................... B62J 1/08 |
| 9,637,192 | B2 * | 5/2017 | Lai | .............................. B62J 1/08 |
| 9,840,294 | B2 | 12/2017 | Hara | |
| 9,840,305 | B1 | 12/2017 | Tsuchizawa et al. | |

(Continued)

FOREIGN PATENT DOCUMENTS

| CN | 104648585 | 5/2015 |
| DE | 102009055763 | 5/2011 |

(Continued)

*Primary Examiner* — Jacob B Meyer
*Assistant Examiner* — Maurice L Williams
(74) *Attorney, Agent, or Firm* — Mori & Ward, LLP

(57) ABSTRACT

A telescopic apparatus comprises a first tube, a second tube, and a non-contact detector. The second tube is configured to be telescopically received in the first tube. The non-contact detector is provided inside at least one of the first tube and the second tube configured to detect a position of the second tube relative to the first tube.

12 Claims, 16 Drawing Sheets

(56) References Cited

U.S. PATENT DOCUMENTS

| | | | |
|---|---|---|---|
| 10,336,400 B2* | 7/2019 | Hara | B62M 9/123 |
| 2013/0138302 A1* | 5/2013 | Hara | B60N 2/02 |
| | | | 701/49 |
| 2015/0137478 A1 | 5/2015 | Shirai | |
| 2015/0268084 A1* | 9/2015 | Southern | G01F 23/284 |
| | | | 188/269 |
| 2017/0088131 A1* | 3/2017 | Liu | G05D 1/0246 |
| 2017/0096184 A1* | 4/2017 | Hara | B62J 1/08 |
| 2017/0096185 A1* | 4/2017 | Hara | B62J 1/08 |
| 2017/0203814 A1* | 7/2017 | Kurokawa | B62K 19/36 |
| 2017/0341705 A1 | 11/2017 | Tsuchizawa et al. | |
| 2017/0343669 A1* | 11/2017 | Tasaki | G06K 9/00805 |
| 2018/0079462 A1 | 3/2018 | Shirai | |
| 2018/0086405 A1* | 3/2018 | Zheng | B62J 6/01 |
| 2018/0194418 A1* | 7/2018 | Bowers | B62J 1/08 |
| 2018/0244330 A1* | 8/2018 | Shirai | B62J 1/08 |
| 2018/0304952 A1 | 10/2018 | Krugman et al. | |
| 2018/0334212 A1* | 11/2018 | Bowers | B62J 1/04 |
| 2019/0193801 A1* | 6/2019 | Hara | B62J 1/08 |

FOREIGN PATENT DOCUMENTS

| | | |
|---|---|---|
| DE | 102017208291 | 11/2017 |
| DE | 102018003262 | 10/2018 |
| TW | 201741179 | 12/2017 |

* cited by examiner

TELESCOPIC APPARATUS FOR HUMAN-POWERED VEHICLE, HEIGHT ADJUSTABLE SEATPOST, AND BICYCLE COMPONENT CONTROL SYSTEM

BACKGROUND OF THE INVENTION

Field of the Invention

The present invention relates to a telescopic apparatus for a human powered vehicle, a height adjustable seatpost, and a bicycle component control system.

Discussion of the Background

Telescopic apparatuses for human powered vehicles such as bicycles include height adjustable seatposts and suspension apparatuses. Whether the human powered vehicles are used for recreation, transportation or competition, telescopic apparatuses are constantly improved and redesigned.

SUMMARY OF THE INVENTION

In accordance with a first aspect of the present invention, a telescopic apparatus comprises a first tube, a second tube, and a non-contact detector. The second tube is configured to be telescopically received in the first tube. The non-contact detector is provided inside at least one of the first tube and the second tube configured to detect a position of the second tube relative to the first tube.

With the telescopic apparatus according to the first aspect, it is possible to detect a position of the second tube relative to the first tube with a simple structure.

In accordance with a second aspect of the present invention, the telescopic apparatus according to the first aspect is configured so that the non-contact detector includes a transmitter to transmit a detecting signal, and a receiver to receive the detecting signal.

With the telescopic apparatus according to the second aspect, it is possible to miniaturize the non-contact detector.

In accordance with a third aspect of the present invention, the telescopic apparatus according to the first or second aspect is configured so that the non-contact detector is configured to detect the position based on a time required for transmission of the detecting signal between the transmitter and the receiver.

With the telescopic apparatus according to the third aspect, it is possible to realize a non-contact detector to detect a position of the second tube relative to the first tube.

In accordance with a fourth aspect of the present invention, the telescopic apparatus according to the second or third aspect is configured so that the detecting signal includes one of a laser and an ultrasonic wave.

With the telescopic apparatus according to the fourth aspect, it is possible to detect the position of the second tube relative to the first tube with a simple structure in an air chamber of at least one of the first tube and the second tube.

In accordance with a fifth aspect of the present invention, the telescopic apparatus according to any one of the second to fourth aspects is configured so that the transmitter is configured to transmit the detecting signal to the receiver along a first direction to detect the position of the second tube relative to the first tube.

With the telescopic apparatus according to the fifth aspect, it is possible to detect a position of the second tube relative to the first tube.

In accordance with a sixth aspect of the present invention, the telescopic apparatus according to the fifth aspect is configured so that the first direction is parallel to a telescopic movement direction of the second tube relative to the first tube.

With the telescopic apparatus according to the sixth aspect, it is possible to detect a position of the second tube relative to the first tube with a simple structure.

In accordance with a seventh aspect of the present invention, the telescopic apparatus according to the fifth aspect is configured so that the detecting signal transmitted from the transmitter is reflected towards a second direction so as to be received by the receiver.

With the telescopic apparatus according to the seventh aspect, it is possible to detect a position of the second tube relative to the first tube with a simple structure.

In accordance with an eighth aspect of the present invention, the telescopic apparatus according to the seventh aspect is configured so that the second direction is opposite to the first direction.

With the telescopic apparatus according to the eighth aspect, it is possible to detect a position of the second tube relative to the first tube with high accuracy.

In accordance with a ninth aspect of the present invention, the telescopic apparatus according to any one of the second to eighth aspects is configured so that the transmitter and the receiver are disposed along a third direction perpendicular to a telescopic movement direction of the second tube relative to the first tube.

With the telescopic apparatus according to the ninth aspect, it is possible to detect a position of the second tube relative to the first tube with high accuracy.

In accordance with a tenth aspect of the present invention, the telescopic apparatus according to any one of the first to ninth aspects further comprises an actuator being provided in at least one of the first tube and the second tube and configured to telescopically position the second tube relative to the first tube.

With the telescopic apparatus according to the tenth aspect, it is possible to telescopically position the second tube relative to the first tube.

In accordance with an eleventh aspect of the present invention, the telescopic apparatus according to any one of the first to tenth aspects is configured so that the telescopic apparatus is a height adjustable seatpost.

With the telescopic apparatus according to the eleventh aspect, it is possible to adjust a height of a seat in the human powered vehicle.

In accordance with a twelfth aspect of the present invention, the telescopic apparatus according to any one of the first to tenth aspects is configured so that the telescopic apparatus is a suspension apparatus.

With the telescopic apparatus according to the twelfth aspect, it is possible to detect a status of the suspension apparatus.

In accordance with a thirteenth aspect of the present invention, a height adjustable seatpost comprises a first tube, a second tube, and a non-contact detector. The second tube is configured to telescopically received in the first tube. The non-contact detector is provided on at least one of the first tube and the second tube configured to detect a position of the second tube relative to the first tube.

With the height adjustable seatpost according to the thirteenth aspect, it is possible to detect a total length of the height adjustable seatpost with a simple structure.

In accordance with a fourteenth aspect of the present invention, the height adjustable seatpost according to the thirteenth aspect further comprises an actuator being provided in at least one of the first tube and the second tube and configured to telescopically position the second tube relative to the first tube.

With the height adjustable seatpost according to the fourteenth aspect, it is possible to telescopically position the second tube relative to the first tube.

In accordance with a fifteenth aspect of the present invention, a bicycle component control system comprises the telescopic apparatus in accordance with any one of the first to the fourteenth aspects, an operating device, and a controller. The operating device is configured to transmit an operating signal indicating a target position of the second tube relative to the first tube. The controller is configured to receive the position detected by the non-contact detector in order to control at least one bicycle component other than the telescopic apparatus.

With the bicycle component control system according to the fifteenth aspect, it is possible to control the at least one bicycle component in accordance with the position of the second tube relative to the first tube.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
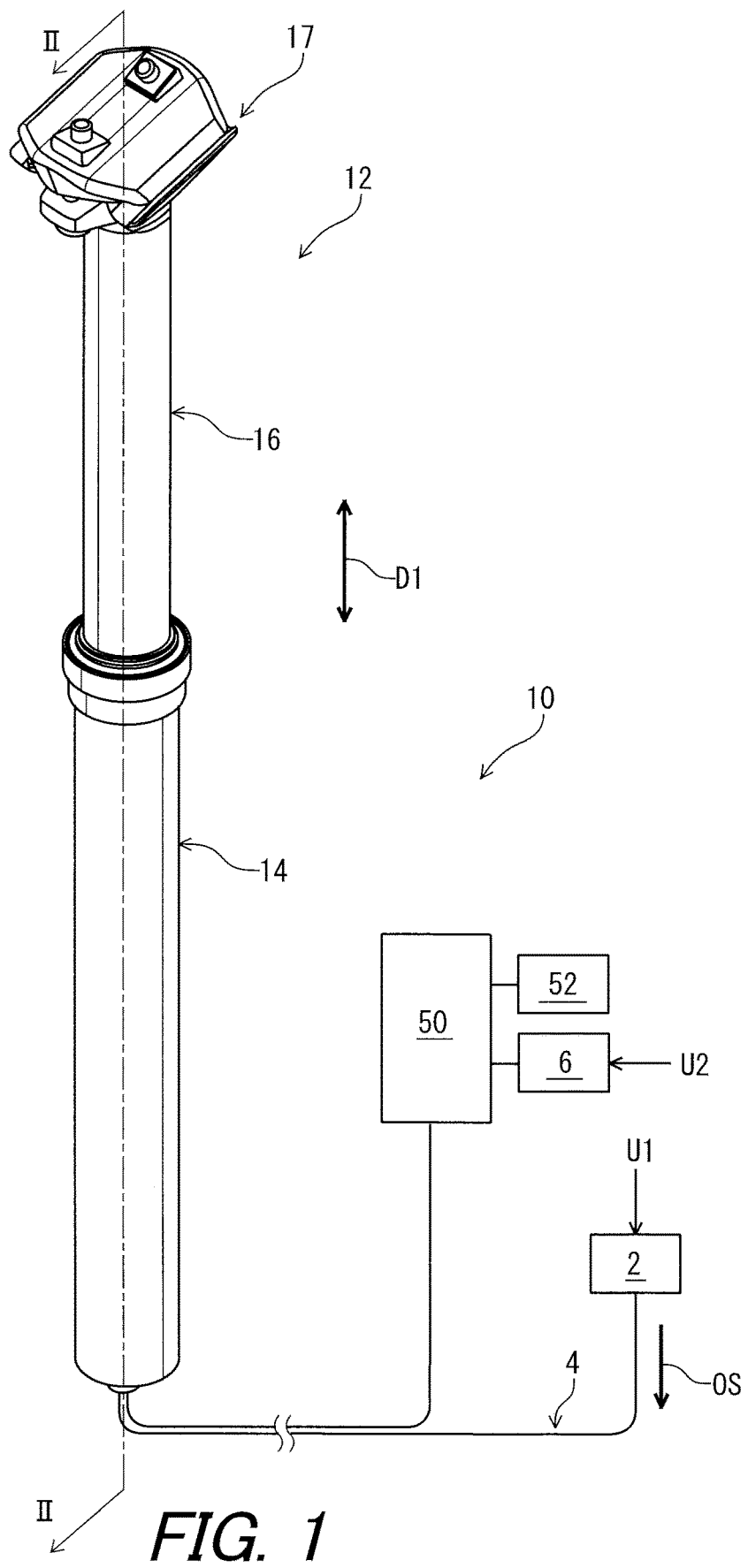
FIG. 1 is a perspective view of a telescopic apparatus in accordance with a first embodiment, with a schematic block diagram of a bicycle component control system.

The embodiment(s) will now be described with reference to the accompanying drawings, wherein like reference numerals designate corresponding or identical elements throughout the various drawings.

First Embodiment

Referring initially to FIG. 1, a bicycle component control system 10 includes a telescopic apparatus 12 in accordance with a first embodiment. In this embodiment, the telescopic apparatus 12 is a height adjustable seatpost. Accordingly, the telescopic apparatus 12 can be referred to as the height adjustable seatpost 12. The telescopic apparatus 12 comprises a first tube 14 and a second tube 16. In other words, the height adjustable seatpost 12 comprises a first tube 14 and a second tube 16. The second tube 16 is configured to be telescopically received in the first tube 14. The first tube 14 and the second tube 16 are movable relative to each other in a telescopic movement direction D1. The telescopic apparatus 12 further comprises a saddle mounting structure 17 to fixedly mount a saddle to one of the first tube 14 and the second tube 16. In this embodiment, the saddle mounting structure 17 is attached to the second tube 16 to fixedly mount the saddle to the second tube 16. However, the saddle mounting structure 17 can be attached to the first tube 14 to fixedly mount the saddle to the first tube 14.

Figure 2:
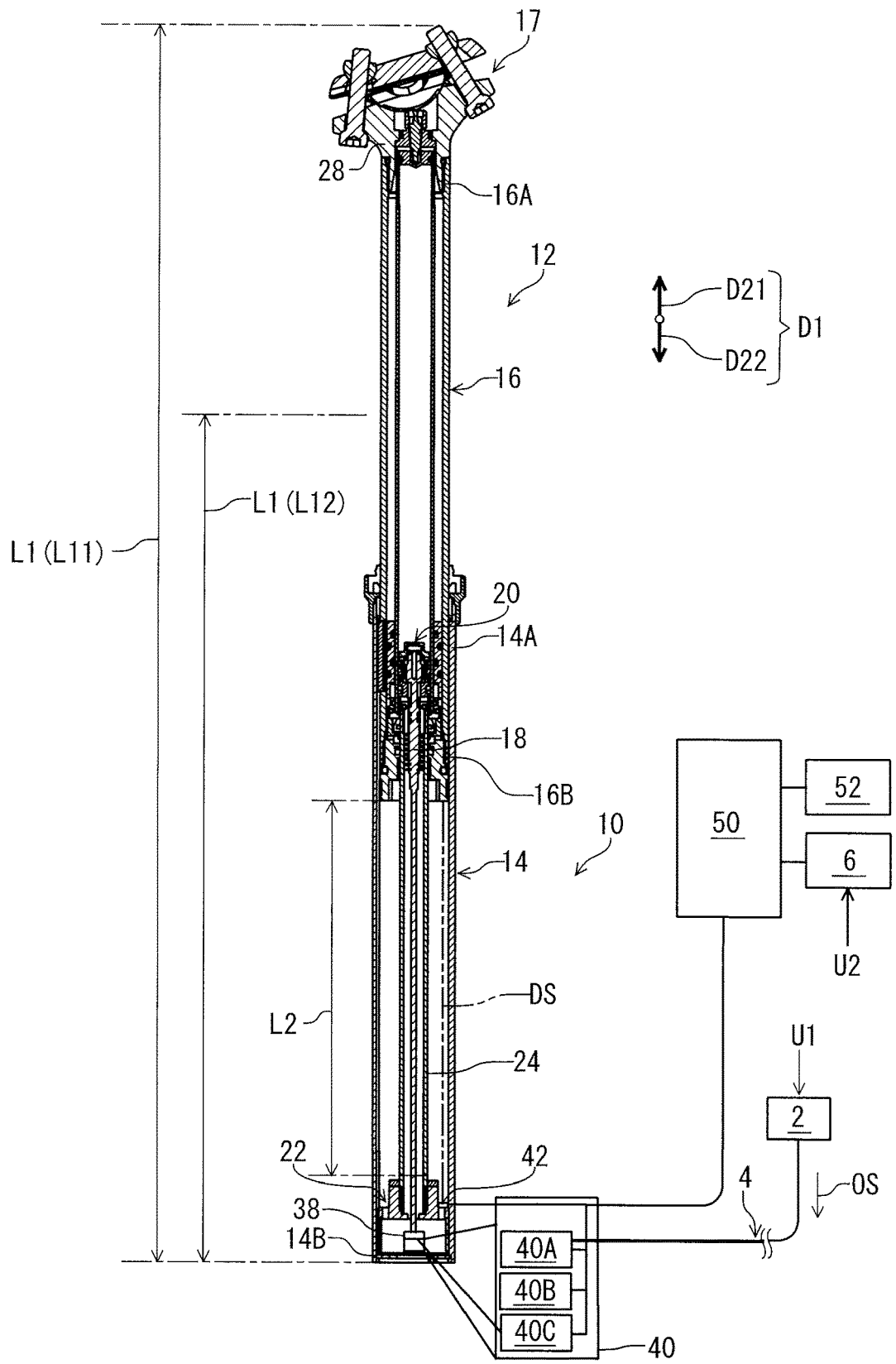
FIG. 2 is a cross-sectional view of the telescopic apparatus taken along line II-II of FIG. 1, with the schematic block diagram of the bicycle component control system.

As seen in FIG. 2, the second tube 16 is telescopically coupled to the first tube 14 to vary a total length L1 of the telescopic apparatus 12. The telescopic apparatus 12 has a maximum total length L11 and a minimum total length L12. The first tube 14 includes a first end 14A and a first opposite end 14B. The first tube 14 extends between the first end 14A and the first opposite end 14B. The second tube 16 includes a second end 16A and a second opposite end 16B. The second tube 16 extends between the second end 16A and the second opposite end 16B. The second opposite end 16B is provided in the first tube 14. The first tube 14 is configured to be detachably attached to a seat tube of a bicycle frame. In this embodiment, the first end 14A is an upper end of the first tube 14 in a mounting state where the telescopic apparatus 12 is mounted to the seat tube. The second end 16A is an upper end of the second tube 16 in the mounting state of the telescopic apparatus 12.

In the present application, the following directional terms "forward", "rearward", "left", "right", "upward" and "downward" as well as any other similar directional terms refer to those directions which are determined on the basis of the rider who sits on a saddle of a bicycle with facing a bicycle handlebar. Accordingly, these terms, as utilized to describe the telescopic apparatus 12, should be interpreted relative to a bicycle equipped with the telescopic apparatus 12 as used in an upright riding position on a horizontal surface.

Figure 3:
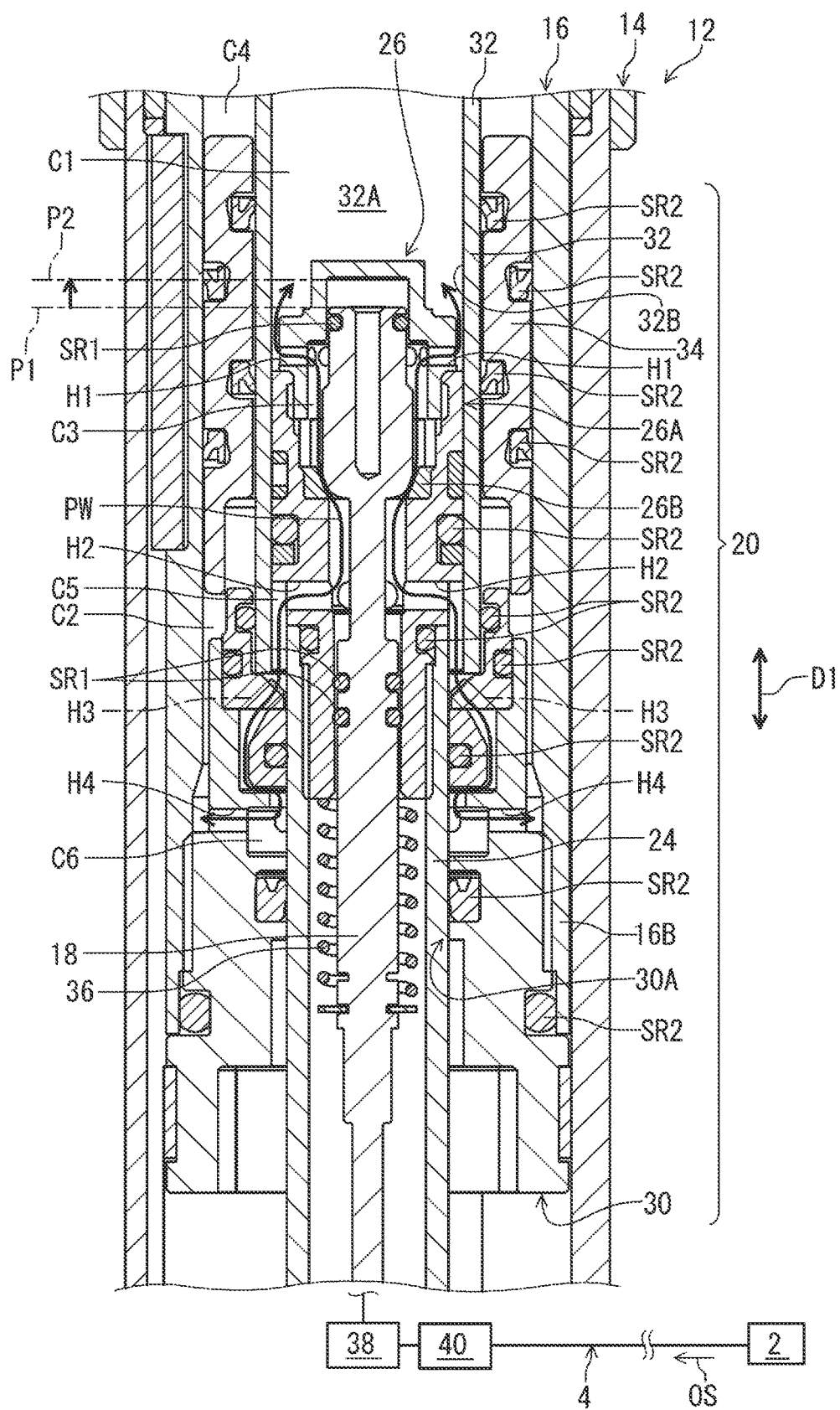
FIG. 3 is a partial cross-sectional view of the telescopic apparatus illustrated in FIG. 2.

As seen in FIG. 3, the telescopic apparatus 12 comprises a movable member 18 movable relative to the first tube 14 in the telescopic movement direction D1. The movable member 18 extends in the telescopic movement direction D1. In this embodiment, the telescopic apparatus 12 further comprises a hydraulic structure 20. The hydraulic structure 20 includes a first hydraulic chamber C1, a second hydraulic chamber C2, and a passageway PW. The passageway PW is provided between the first hydraulic chamber C1 and the second hydraulic chamber C2. The movable member 18 is movable relative to the hydraulic structure 20 to change a state of the hydraulic structure 20 between a closed state where the movable member 18 closes the passageway PW and an open state where the movable member 18 opens the passageway PW. The first hydraulic chamber C1 and the second hydraulic chamber C2 are filled with a substantially incompressible fluid (e.g., oil). The movable member 18 is movable relative to the hydraulic structure 20 between a closed position P1 and an open position P2 in the telescopic movement direction D1. The hydraulic structure 20 is in the closed state in a state where the movable member 18 is in the closed position P1. The hydraulic structure 20 is in the open state in a state where the movable member 18 is in the open position P2.

Figure 4:
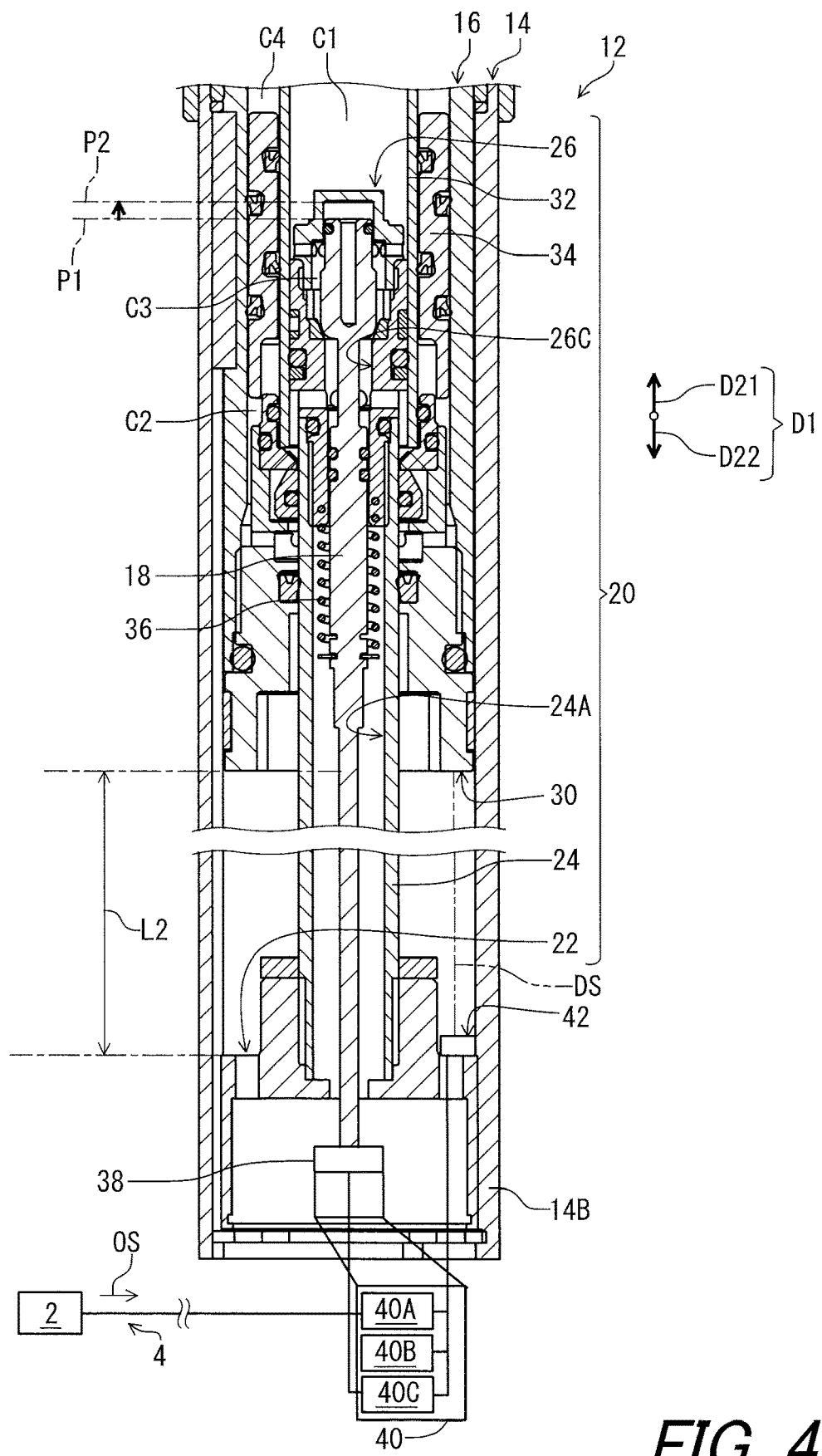
FIG. 4 is a partial cross-sectional view of the telescopic apparatus illustrated in FIG. 2.

As seen in FIG. 4, the hydraulic structure 20 includes a first support 22, a first inner tube 24, and a valve body 26. The first support 22 is secured to the first opposite end 14B of the first tube 14. The first inner tube 24 is secured to the first support 22 and provided in the first tube 14. The first inner tube 24 extends from the first support 22 in the telescopic movement direction D1. The valve body 26 is secured to an end of the first inner tube 24. The valve body 26 includes an internal cavity 26C. The first inner tube 24 includes a cavity 24A. The movable member 18 is movably provided in the internal cavity 26C and the cavity 24A. The movable member 18 and the valve body 26 define a valve chamber C3 in the internal cavity 26C.

Figure 5:
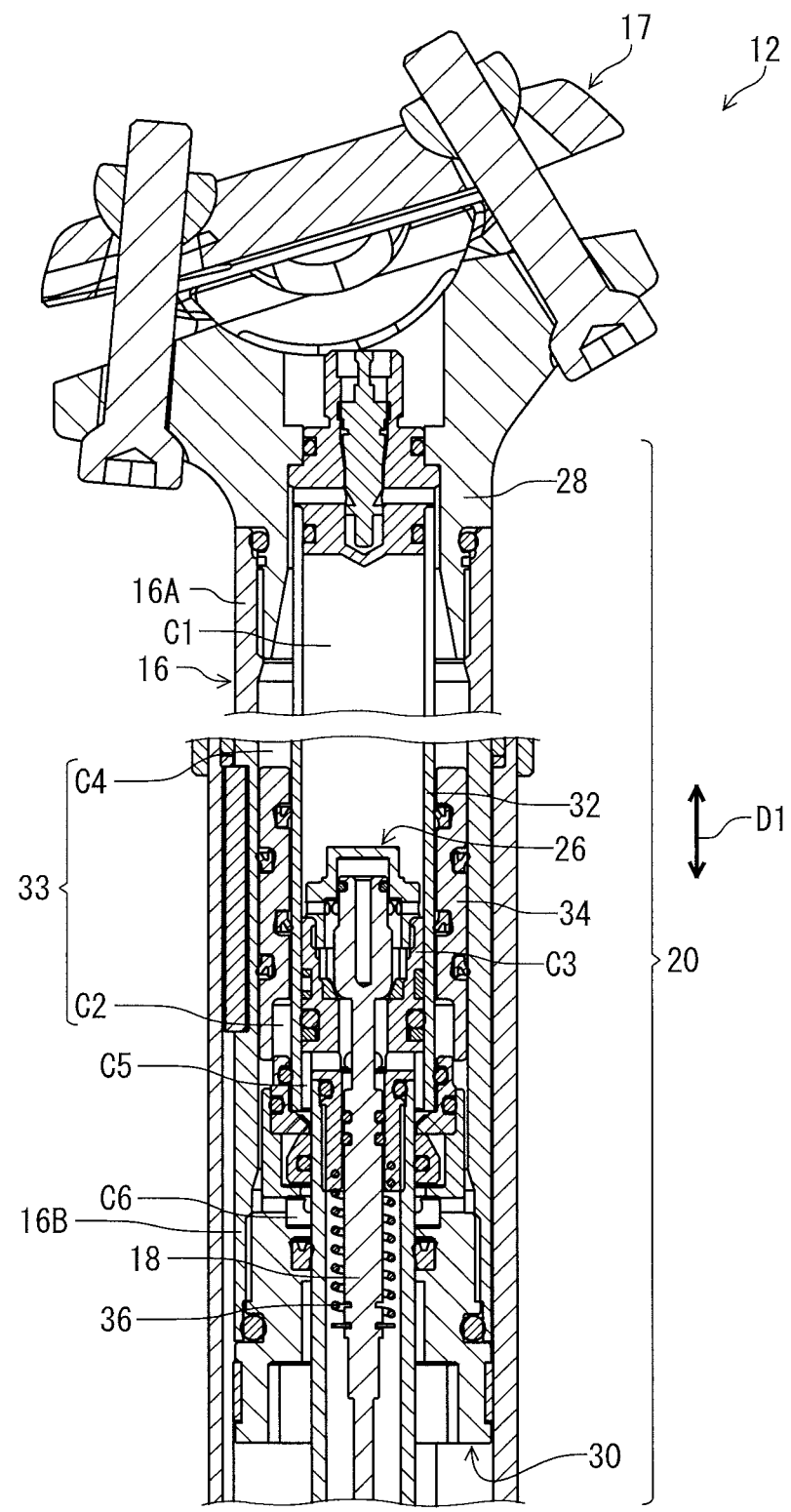
FIG. 5 is a partial cross-sectional view of the telescopic apparatus illustrated in FIG. 2.

As seen in FIG. 5, the hydraulic structure 20 includes a second support 28, an intermediate support 30, and a second inner tube 32. The second support 28 is secured to the second end 16A of the second tube 16. The second support 28 is integrally provided with the saddle mounting structure 17 and couples the saddle mounting structure 17 to the second tube 16. The intermediate support 30 is secured to the second opposite end 16B of the second tube 16. The second inner tube 32 is provided in the second tube 16 and disposed between the second support 28 and the intermediate support 30. The second support 28 and the intermediate support 30 are secured to the second tube 16 to hold the second inner tube 32 in the second tube 16. The second tube 16, the second inner tube 32, the second support 28, and the intermediate support 30 define an internal space 33.

The hydraulic structure 20 includes a floating piston 34. The floating piston 34 is movably provided in the internal space 33 to divide the internal space 33 into the second hydraulic chamber C2 and a biasing chamber C4. The biasing chamber C4 is filled with a compressible fluid (e.g., gas such as air) to produce biasing force to lengthen the telescopic apparatus 12. The compressible fluid is compressed in the biasing chamber C4 to produce the biasing force in a state where the total length L1 of the telescopic apparatus 12 is the maximum total length L11 (FIG. 2).

As seen in FIG. 3, the intermediate support 30 includes a support opening 30A. The first inner tube 24 extend through the support opening 30A. The valve body 26 is movably provided in a cavity 32A of the second inner tube 32. The valve body 26 is in slidable contact with an inner peripheral surface 32B of the second inner tube 32. As seen in FIG. 5, the valve body 26, the second inner tube 32, and the second support 28 define the first hydraulic chamber C1 in the second inner tube 32.

As seen in FIG. 3, the first inner tube 24, the valve body 26, the second inner tube 32, and the intermediate support 30 define a first intermediate chamber C5 and a second intermediate chamber C6. The valve body 26 includes a plurality of first holes H1 and a plurality of second holes H2. The plurality of first holes H1 connects the first hydraulic chamber C1 to the valve chamber C3. The plurality of second holes H2 connects the valve chamber C3 to the first intermediate chamber C5. The intermediate support 30 includes a plurality of third holes H3 and a plurality of fourth holes H4. The plurality of third holes H3 connects the first intermediate chamber C5 to the second intermediate chamber C6. The plurality of fourth holes H4 connects the second intermediate chamber C6 to the second hydraulic chamber C2. The passageway PW includes the plurality of first holes H1, the valve chamber C3, the plurality of second holes H2, the first intermediate chamber C5, the plurality of third holes H3, the second intermediate chamber C6, and the plurality of fourth holes H4.

The valve body 26 includes a base member 26A and a valve seat 26B. The base member 26A includes the plurality of first holes H1 and the plurality of second holes 112. The valve seat 26B is attached to the base member 26A to be contactable with the movable member 18. The movable member 18 is in contact with the valve seat 26B to close the passageway PW in the closed state where the movable member 18 is in the closed position P1. The movable member 18 is spaced apart from the valve seat 26B to open the passageway PW in the open state where the movable member 18 is in the open position P2.

The telescopic apparatus 12 comprises a biasing member 36 to bias the movable member 18 toward the closed position P1. The biasing member 36 is provided in the first inner tube 24. For example, the biasing member 36 includes a spring. The movable member 18 includes a plurality of seal rings SR1. The hydraulic structure 20 includes a plurality of seal rings SR2. One of the seal rings SR2 which is provided between the first support 22 and the first inner tube 24 is an example of a seal.

The substantially incompressible fluid does not flow between the first hydraulic chamber C1 and the second hydraulic chamber C2 in the closed state where the movable member 18 closes the passageway PW. Thus, in the closed state, the first tube 14 and the second tube 16 are fixedly positioned relative to each other in the telescopic movement direction D1.

The substantially incompressible fluid can flow between the first hydraulic chamber C1 and the second hydraulic chamber C2 through the passageway PW in the open state where the movable member 18 opens the passageway PW. For example, when the rider's weight is applied to the second tube 16 in the open state, the substantially incompressible fluid flows from the first hydraulic chamber C1 to the second hydraulic chamber C2 through the passageway PW. Thus, the floating piston 34 is pressed toward the biasing chamber C4 relative to the first tube 14, increasing a volume of the second hydraulic chamber C2 while the compressible fluid is compressed in the biasing chamber C4. This downwardly moves the second tube 16 relative to the first tube 14 against the basing force of the biasing chamber C4 while the rider's weight is applied to the second tube 16, allowing the rider to lower the saddle using the rider's weight in the open state.

The compressible fluid compressed in the biasing chamber C4 biases the second tube 16 to upwardly move relative to the first tube 14 in the telescopic movement direction D1 and to downwardly move the floating piston 34 in the telescopic movement direction D1. When the rider's weight is released from the second tube 16 in the open state, the substantially incompressible fluid flows from the second hydraulic chamber C2 to the first hydraulic chamber C1 through the passageway PW because of the biasing force of the biasing chamber C4. This upwardly moves the second tube 16 relative to the first tube 14 while the rider's weight is released from the second tube 16, allowing the rider to lift the saddle by releasing the rider's weight in the open state.

As seen in FIG. 2, the telescopic apparatus 12 further comprises an actuator 38. The actuator 38 is configured to telescopically position the second tube 16 relative to the first tube 14. More specifically, the actuator 38 is configured to move the movable member 18 relative to the first tube 14 in the telescopic movement direction D1. The actuator 38 is provided in at least one of the first tube 14 and the second tube 16. The actuator 38 is entirely provided in the at least one of the first tube 14 and the second tube 16. However, the position of the actuator 38 is not limited to this embodiment.

As seen in FIG. 4, the actuator 38 is operatively coupled to the movable member 18 to move the movable member 18 from the closed position P1 to the open position P2 relative to the hydraulic structure 20 in the telescopic movement direction D1. In this application, the actuator 38 may include a motor, a solenoid, or any other electrical actuator. In a case where the actuator 38 includes a motor, the actuator may further include a speed reducer to convert rotation of the motor into linear motion of the movable member 18. In a case where the actuator 38 includes a solenoid, the solenoid is preferably configured to move the movable member 18 in the telescopic movement direction.

As seen in FIGS. 2 to 4, and 6, the bicycle component control system 10 further comprises an operating device 2 configured to transmit an operating signal OS. The operating signal OS indicates whether the second tube 16 is movable or locked relative to the first tube 14. In other words, the operating signal OS indicates whether the movable member 18 is controlled to be the closed position P1 or the open position P2. The operating device 2 includes an electrical switch 2A configured to receive a user input U1 to generate the operating signal OS. The electrical switch 2A is, for example, a two-position switch having two positions corresponding to the closed position P1 and the open position P2 of the movable member 18. The operating device 2 is provided at a position (e.g., a handlebar) where the rider can access the operating device 2. The operating device 2 is coupled to the telescopic apparatus 12 via an electric cable 4. The operating device 2 is configured to transmit the operating signal OS via the electric cable 4. However, the operating device 2 can transmit the operating signal OS via wireless communication if needed and/or desired. Further, the bicycle component control system 10 further comprises an electric power source mounted on a bicycle frame to provide an electric energy to the actuator 38, an actuation controller 40 (which is described below), and the operating device 2.

Figure 6:
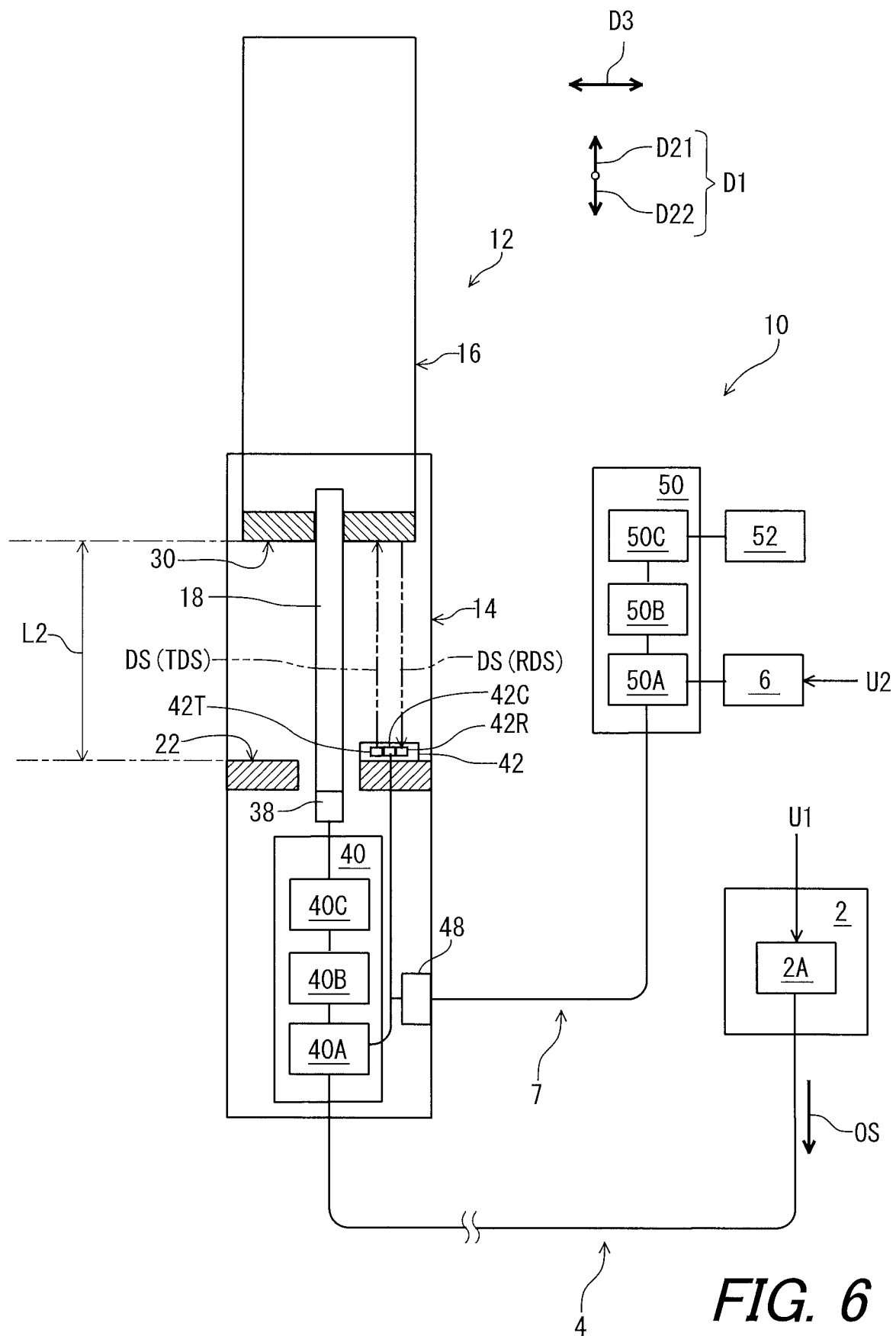
FIG. 6 is a schematic block diagram of the bicycle component control system illustrated in FIG. 1.

As seen in FIGS. 2, 4, and 6, the telescopic apparatus 12 comprises the actuation controller 40 electrically connected to the actuator 38 to control the actuator 38 in response to the operating signal OS. The actuation controller 40 includes a processor 40A, a memory 40B, and an actuator driver 40C. The processor 40A is electrically connected to the memory 40B. The processor 40A includes a central processing unit (CPU). The memory 40B stores programs and other information. The memory 40B includes a read only memory (ROM), a random-access memory (RAM), and a memory controller. For example, a program stored in the memory 40B is read into the processor 40A, and thereby several functions of the actuation controller 40 are performed. By executing the program, the processor 40A can recognize the operating signal OS transmitted from the operating device 2 via the electric cable 4 to generate a control signal to control the actuator driver 40C. The actuator driver 40C controls the actuator 38 based on the control signal generated by the processor 40A. In a case where the actuator 38 includes the motor, the actuator driver 40C includes a motor driver to control a rotational direction and/or a rotational speed of an output shaft of the motor based on the control signal generated by the processor 40A. In a case where the actuator 38 includes the solenoid, the actuator driver 40C include a control circuit of the solenoid to control electric current applied to a coil of the solenoid based on the control signal generated by the processor 40A.

Figure 7:
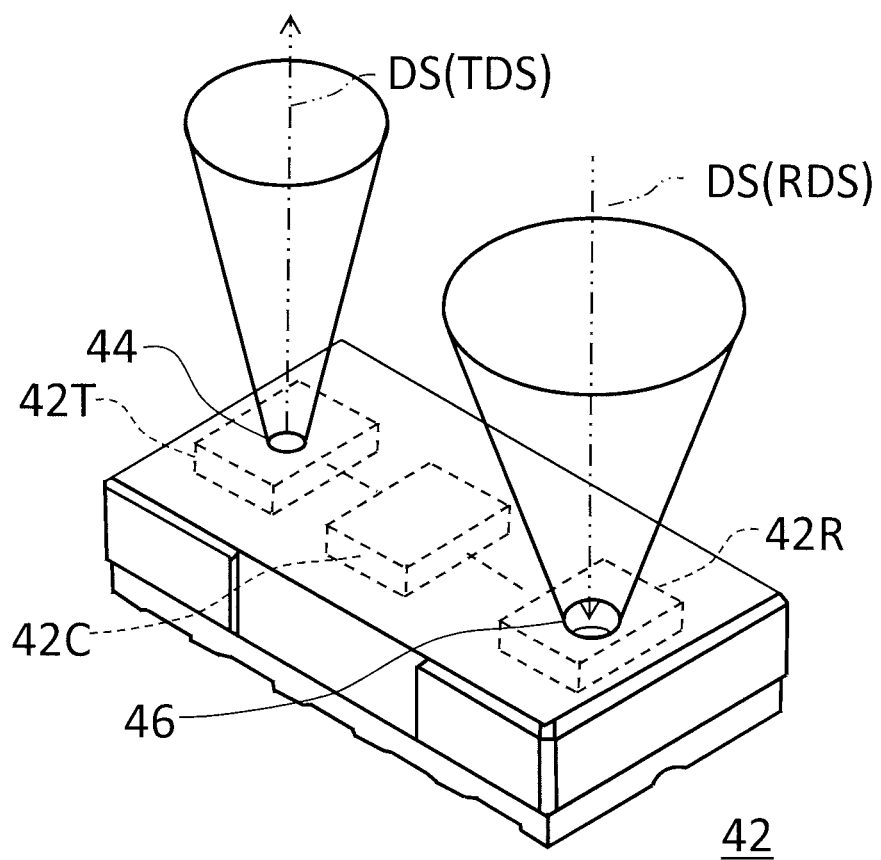
FIG. 7 is an enlarged view of a non-contact detector illustrated in FIGS. 2 and 4.

As seen in FIGS. 2 and 4, the telescopic apparatus 12 comprises a non-contact detector 42 provided inside at least one of the first tube 14 and the second tube 16 configured to detect a position of the second tube 16 relative to the first tube 14. In other words, the height adjustable seatpost 12 comprises a non-contact detector 42 provided inside at least one of the first tube 14 and the second tube 16 configured to detect a position of the second tube 16 relative to the first tube 14. The non-contact detector 42 is for example, an ultrasonic sensor or a laser displacement sensor. As seen in FIG. 7, the non-contact detector 42 includes a transmitter 42T to transmit a detecting signal DS, and a receiver 42R to receive the detecting signal DS. The detecting signal DS is transmitted to detect the position of the second tube 16 relative to the first tube 14. The non-contact detector 42 includes a first aperture 44 through which the detecting signal DS that is transmitted from the transmitter 42T passes. The detecting signal DS that passes through the first aperture 44 before being reflected by a member provided inside at least one of the first tube 14 and second tube 16 can be referred to as a transmitted detecting signal TDS. The transmitted detecting signal TDS is reflected by the member to be returned to the receiver 42R. The detecting signal DS that returns to the receiver 42R can be referred to as a returned detecting signal RDS. The non-contact detector 42 includes a second aperture 46 through which the returned detecting signal RDS passes. In other words, the non-contact detector 42 includes a second aperture 46 through which the detecting signal DS passes immediately before being received by the receiver 42R.

The detecting signal DS includes one of a laser and an ultrasonic wave. The detecting signal DS may further include a radio wave. More specifically, in a case where the non-contact detector 42 is an ultrasonic sensor, the detecting signal DS is an ultrasonic wave. In this case, the transmitter 42T includes a wave transducer usually made of piezoelectric ceramic, and a vibration generating circuit to apply voltage to the wave transducer to vibrate the wave transducer. The receiver 42R includes a wave transducer usually made of piezoelectric ceramic, and a vibration detecting circuit to detect the vibration of the wave transducer by detecting an electromotive force generated by the wave transducer vibrating due to the reception of the ultrasonic wave. The vibration detecting circuit can include an amplifier to amplify an electric signal caused by the electromotive force. Further, the non-contact detector 42 can further include a horn provided between the first aperture 44 and the transmitter 42T to arrange directivity of the transmitted detecting signal TDS, and a sound collection device provided between the second aperture 46 and the receiver 42R to collect the returned detecting signal RDS. In this embodiment, the transmitter 42T and the receiver 42R are separated from each other, but the transmitter 42T and the receiver 42R can be integrated into a single unit (an integrated transmitter/receiver) performing functions of the transmitter 42T and the receiver 42R. In a case where the non-contact detector 42 includes an integrated transmitter/receiver, the non-contact detector 42 can include a single aperture through which both the transmitted detecting signal TDS and the returned detecting signal RDS passes, a single horn capable of arranging directivity of the ultrasonic wave and collecting the returned detecting signal RDS. The integrated transmitter/receiver includes a single wave transducer and an integrated circuit having functions of both the vibration generating circuit and the vibration detecting circuit.

Figure 8:
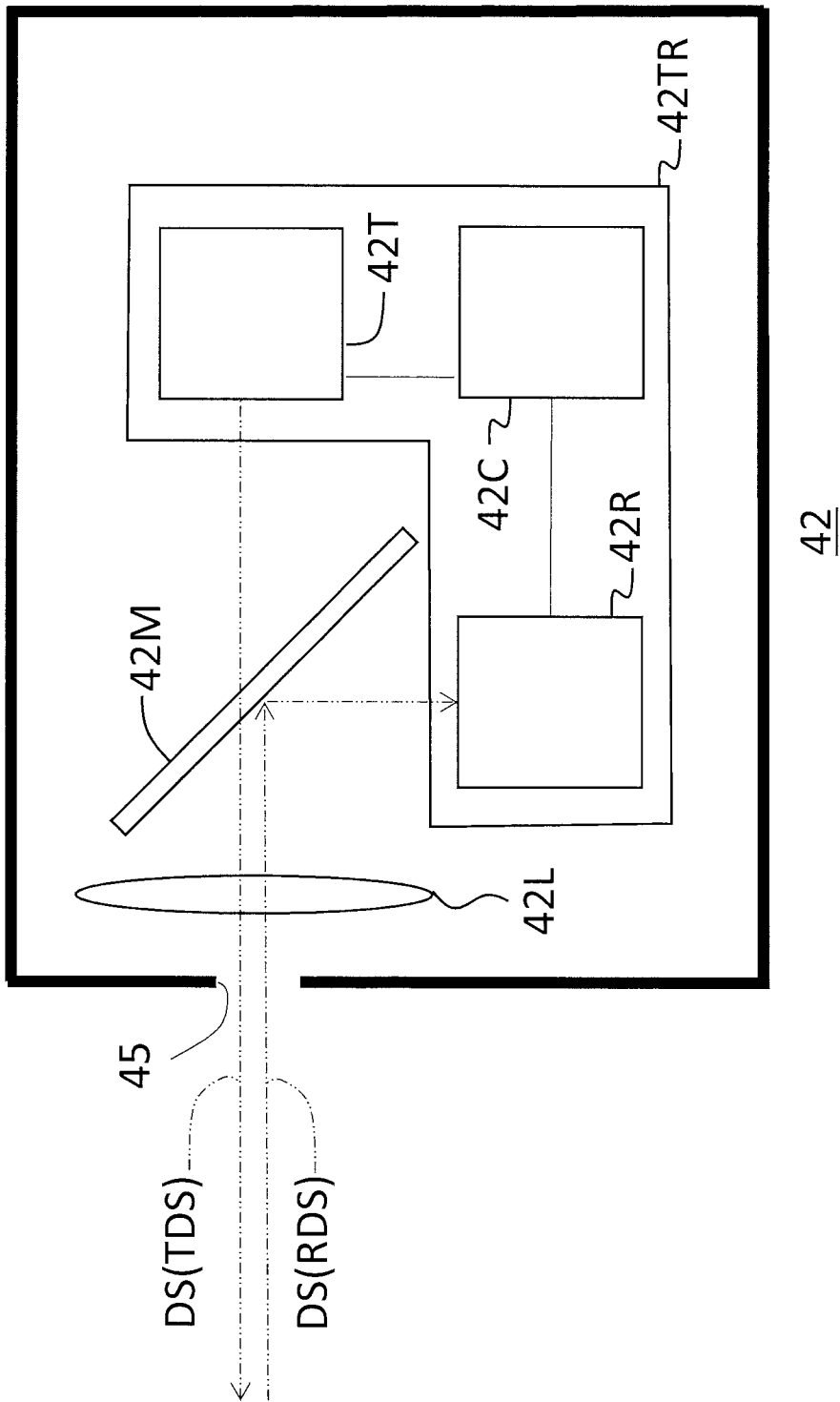
FIG. 8 is another example of a non-contact detector.

In a case where the non-contact detector 42 is a laser displacement sensor, the detecting signal DS is a laser. In this case, the transmitter 42T includes a laser diode or a semiconductor laser element, and a laser driver to apply voltage to the laser diode or the semiconductor laser element. The receiver 42R includes a photodetector, and a signal detecting circuit to detect the laser. The signal detecting circuit can include an amplifier to amplify an electric signal generated by the photodetector upon reception of the returned detecting signal RDS. Further, the non-contact detector 42 can further include an irradiation lens provided between the first aperture 44 and the transmitter 42T to arrange a laser beam of the transmitted detecting signal TDS, and a condensing lens provided between the second aperture 46 and the receiver 42R to collect the returned detecting signal RDS. In FIG. 7, the first aperture 44 and the second aperture 46 are separated from each other, but as shown in FIG. 8, the first aperture 44 and the second aperture 46 are integrated into a single aperture 45 through which both the transmitted detecting signal TDS and the returned detecting signal RDS passes. In this case, the non-contact detector 42 can further include a half mirror 42M between the single aperture 45 and each of the transmitter 42T and the receiver 42R. The transmitted detecting signal TDS can pass through the half mirror 42M, and the returned detecting signal RDS can be reflected by the half mirror 42M and transmitted to the receiver 42R. Alternatively, the transmitted detecting signal TDS transmitted by the transmitter 42T can be reflected by the half mirror 42M to pass through the single aperture 45, and the returned detecting signal RDS can pass through the half mirror 42M. In addition, as shown in FIG. 8, the non-contact detector 42 can further include a lens 42L provided between the single aperture 45 and the half mirror 42M to arrange a laser beam of the transmitted detecting signal TDS and to collect the returned detecting signal RDS. Alternatively, the non-contact detector 42 can include the irradiation lens between the half mirror 42M and the transmitter 42T, and the condensing lens between the half mirror 42M and the receiver 42R. Further, the transmitter 42T and the receiver 42R can be integrated into a single circuit (an integrated transmitter/receiver) performing functions of the transmitter 42T and the receiver 42R.

As seen in FIGS. 2, 4, 6, the non-contact detector 42 is preferably disposed on the first support 22 in the first tube 14. As seen in FIG. 6. The transmitter 42T is configured to transmit the detecting signal DS to the receiver 42R along a first direction D21 to detect the position of the second tube 16 relative to the first tube 14. That is, the transmitted detecting signal TDS is transmitted in the first direction D21.

The detecting signal DS transmitted from the transmitter 42T is reflected toward a second direction D22 so as to be received by the receiver 42R. That is, the returned detecting signal RDS is transmitted in the second direction D22. The detecting signal DS is preferably reflected by the intermediate support 30 secured to the second opposite end 16B of the second tube 16. The first direction D21 is parallel to the telescopic movement direction D1 of the second tube 16 relative to the first tube 14. The second direction D22 is opposite to the first direction D21.

As seen in FIG. 6, the transmitter 42T and the receiver 42R are disposed along a third direction D3 perpendicular to the telescopic movement direction D1 of the second tube 16 relative to the first tube 14. Accordingly, the receiver 42R can receive the returned detecting signal RDS. In the illustrated embodiment, the transmitter 42T and the receiver 42R are arranged in a radial direction of the first tube 14. However, the transmitter 42T and the receiver 42R may be arranged in another direction (e.g. a circumferential direction of the first tube 14) which is perpendicular to the telescopic movement direction D1 of the second tube 16 relative to the first tube 14. In FIG. 6, a distance between the transmitter 42T and the receiver 42R is illustrated to be longer compared to the distance L2 between the first support 22 and the intermediate support 30 than a distance between the transmitter 42T and the receiver 42R compared to the distance L2 in reality. However, the distance between the transmitter 42T and the receiver 42R is minute with respect to the distance L2. Accordingly, a propagated distance of the detecting signal DS is approximately double of the distance L2.

The non-contact detector 42 is configured to detect the position (the position of the second tube 16 relative to the first tube 14) based on a time required for transmission of the detecting signal DS between the transmitter 42T and the receiver 42R. Let TOF be a time (a time of flight) in which the detecting signal DS travels from the transmitter 42T to the receiver 42R, and v be a speed of the detecting signal DS. Then, the distance L2 is approximately equal to (TOF*v/2). As seen in FIGS. 7 and 8, the non-contact detector 42 can include a calculator 42C electrically connected to the transmitter 42T and the receiver 42R to calculate the time of flight and the distance L2. Alternatively, the processor 40A of the actuation controller 40 may calculate the time of flight and the distance L2.

However, the non-contact detector 42 may be configured to detect the position (the position of the second tube 16 relative to the first tube 14) by using a different technique. For example, the non-contact detector 42 may be configured to detect the position based on a phase difference between the transmitted detecting signal TDS and the returned detecting signal RDS. In this case, the calculator 42C or the processor 40A of the actuation controller 40 can calculate the phase difference and the position (the distance L2).

Further, in a case where the non-contact detector 42 is a laser displacement sensor, the non-contact detector 42 may be configured to detect the position (the position of the second tube 16 relative to the first tube 14) by triangulation. In this case, preferably, the non-contact detector 42 includes two separate apertures 44 and 46, and the receiver 42R preferably includes a position sensitive element in place of the photodetector. The non-contact detector 42 is configured to detect the position based on a position at which the position sensitive element detects the returned detecting signal RDS. Preferably, the distance between the first aperture 44 (the transmitter 42T) and the second aperture 46 (the receiver 42R) is preferably larger than that used for time of flight or phase difference technique. In this case, the calculator 42C or the processor 40A of the actuation controller 40 can calculate the position of the second tube 16 relative to the first tube 14 (the distance L2) on the position at which the position sensitive element detects the returned detecting signal RDS.

As seen in FIG. 6, at least one of the non-contact detector 42 and the actuation controller 40 is connected to an output interface 48 to output the position of the second tube 16 relative to the first tube 14 which is detected by the non-contact detector 42. The bicycle component control system 10 comprises a controller 50 configured to receive the position detected by the non-contact detector 42 in order to control at least one bicycle component 52 other than the telescopic apparatus 12. As shown in FIG. 6, the controller 50 is connected to the output interface 48 via an electric cable 7 to receive an electric signal related to the position from the output interface 48. However, the controller 50 can communicate with the output interface 48 via wireless communication to receive an electric signal related to the position from the output interface 48. The at least one bicycle component 52 can include at least one of a (front or rear) derailleur, a suspension apparatus, and an assist motor to generate auxiliary drive force to assist pedaling. The bicycle component control system 10 may further comprises at least one additional operating device 6 configured to receive a user input U2 to operate the at least one bicycle component 52. The at least one additional operating device 6 can include a lever, a switch, a cyclocomputer, and the like which are provided at a position (e.g., a handlebar) where the rider can access the at least one additional operating device 6. The controller 50 includes an additional processor 50A, an additional memory 50B, and a component driver 50C. The additional processor 50A is electrically connected to the additional memory 50B. The additional processor 50A includes a central processing unit (CPU). The additional memory 50B stores programs and other information. The additional memory 50B includes a read only memory (ROM), a random-access memory (RAM), and a memory controller. For example, a program stored in the additional memory 50B is read into the additional processor 50A, and thereby several functions of the controller 50 are performed. By executing the program, the additional processor 50A can recognize additional operating signal that is transmitted from the additional operating device 6 to generate a control signal to control the component driver 50C. Further, the additional processor 50A can receive the position detected by the non-contact detector 42 to generate a control signal to control the component driver 50C. The component driver 50C controls the at least one bicycle component 52 based on the control signal generated by the additional processor 50A.

In a case where the at least one bicycle component 52 includes a derailleur, the component driver 50C includes a derailleur actuator driver to control a derailleur actuator (e.g. motor) to change a gear ratio of the derailleur based on the control signal generated by the additional processor 50A. More specifically, the controller 50 can change the gear ratio of the derailleur in accordance with the total length L1 of the telescopic apparatus which can be calculated by the position of the second tube 16 relative to the first tube 14. For example, the controller 50 can change the gear ratio of the derailleur to a higher gear ratio when the total length L1 of the telescopic apparatus becomes shorter. The controller 50 can change the gear ratio of the derailleur to a lower gear ratio when the total length L1 of the telescopic apparatus becomes longer. The additional memory 50B can store at least one threshold length such that the additional processor 50A can determine whether the total length L1 of the telescopic apparatus becomes shorter or longer.

In a case where the at least one bicycle component 52 includes a suspension apparatus, the component driver 50C includes a valve actuator driver to control a valve actuator (e.g. motor) in the suspension apparatus to open or close a valve structure of the suspension apparatus to change a state of the suspension apparatus among an unlocked state and a locked state based on the control signal generated by the additional processor 50A. In the unlocked state, one suspension tube is movable with respect to another suspension tube in the suspension apparatus. In the locked state, one suspension tube is locked relative to another suspension tube in the suspension apparatus. More specifically, for example, the controller 50 can change the state of the suspension apparatus to the unlocked state when the total length L1 of the telescopic apparatus which can be calculated by the position of the second tube 16 relative to the first tube 14 is less than a threshold length. Alternatively, the controller 50 can change the state of the suspension apparatus to the locked state when the total length L1 of the telescopic apparatus becomes more than or equal to the threshold length. The additional memory 50B can store this threshold length In a case where the at least one bicycle component 52 includes an assist motor, the component driver 50C includes a motor driver to control the assist motor based on the control signal generated by the additional processor 50A. More specifically, the controller 50 can change an assist ratio of a pedaling torque to an output torque of the assist motor in accordance with the total length L1 of the telescopic apparatus which can be calculated by the position of the second tube 16 relative to the first tube 14. For example, the controller 50 can change the assist ratio to a higher assist ratio when the total length L1 of the telescopic apparatus becomes longer. The controller 50 can change the assist ratio to a lower assist ratio when the total length L1 of the telescopic apparatus becomes shorter. The additional memory 50B can store at least one threshold length such that the additional processor 50A can determine whether the total length L1 of the telescopic apparatus becomes shorter or longer.

Modification of First Embodiment

Figure 9:
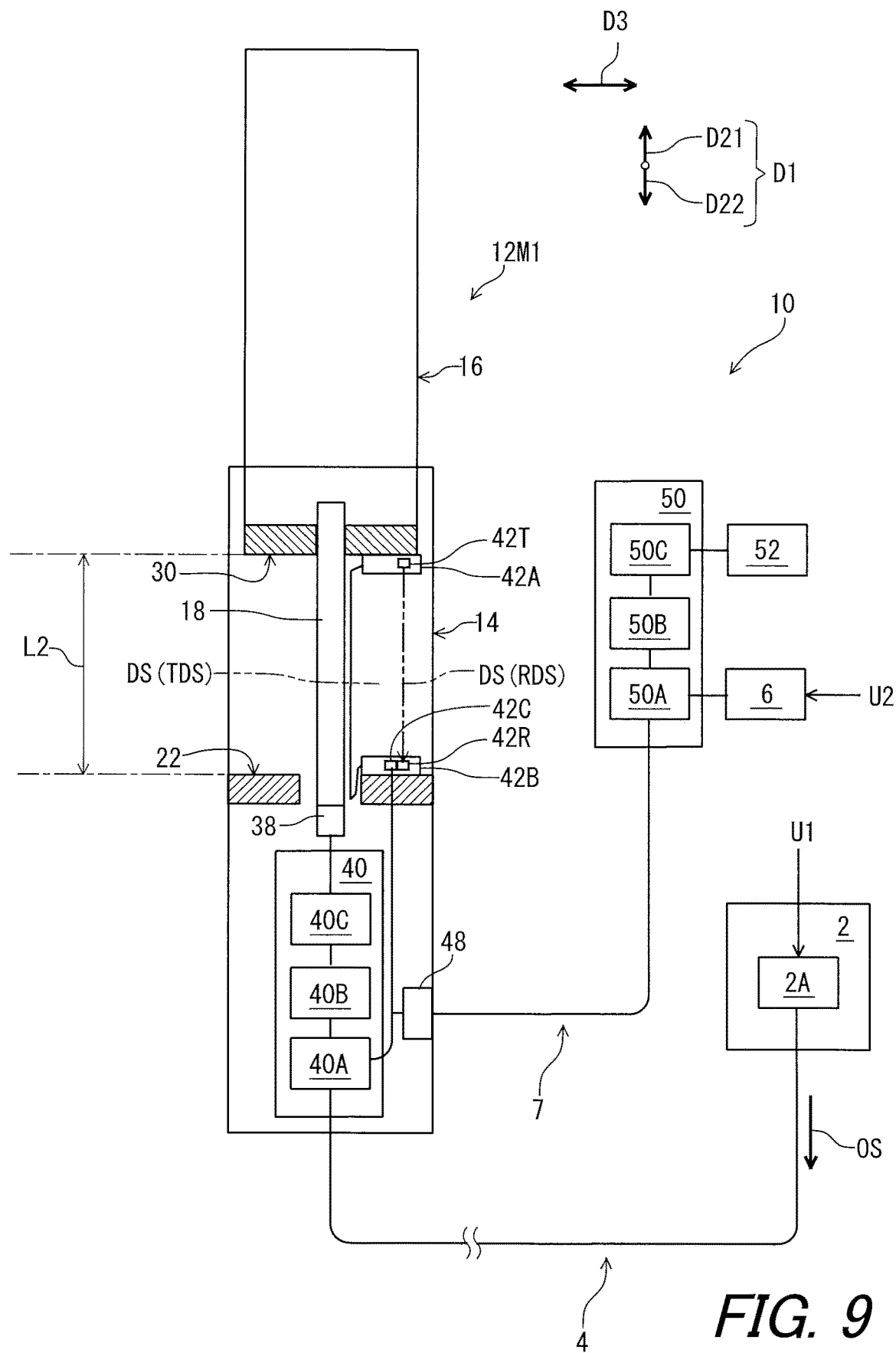
FIG. 9 is one example of the telescopic apparatus in accordance with one modification of the first embodiment.

In the above embodiment, the non-contact detector 42 consists of a single unit including both the transmitter 42T and the receiver 42R. However, the non-contact detector 42 can consist of multiple units each of which includes either the transmitter 42T or the receiver 42R. A telescopic apparatus 12M1 in accordance with one example of a modification of the first embodiment will be described below referring to FIG. 9. In this modification, the bicycle component control system 10 comprises a first non-contact detector 42A and a second non-contact detector 42B in place of the non-contact detector 42A. The first non-contact detector 42A includes the transmitter 42T. The second non-contact detector 42B includes the receiver 42R and the calculator 42C. However, the calculator 42C can be included in the first non-contact detector 42A or can be omitted both in the first and second non-contact detectors 42A and 42B. In this case, the processor 40A of the actuation controller 40 can calculate the position of the second tube 16 relative to the first tube 14. In this modification, the receiver 42R can receive the operating signal OS without being reflected by any member provided inside at least one of the first tube 14 and second tube 16. Preferably, the transmitter 42T is provided on one of the first support 22 and the intermediate support 30 and the receiver 42R is provided on the other of the first support 22 and the intermediate support 30. As seen in FIG. 9, a propagated distance of the detecting signal DS is approximately the distance L2. Let TOF be a time (a time of flight) in which the detecting signal DS travels from the transmitter 42T to the receiver 42R, and v be a speed of the detecting signal DS. Then, the distance L2 is approximately equal to (TOF*v).

Figure 10:
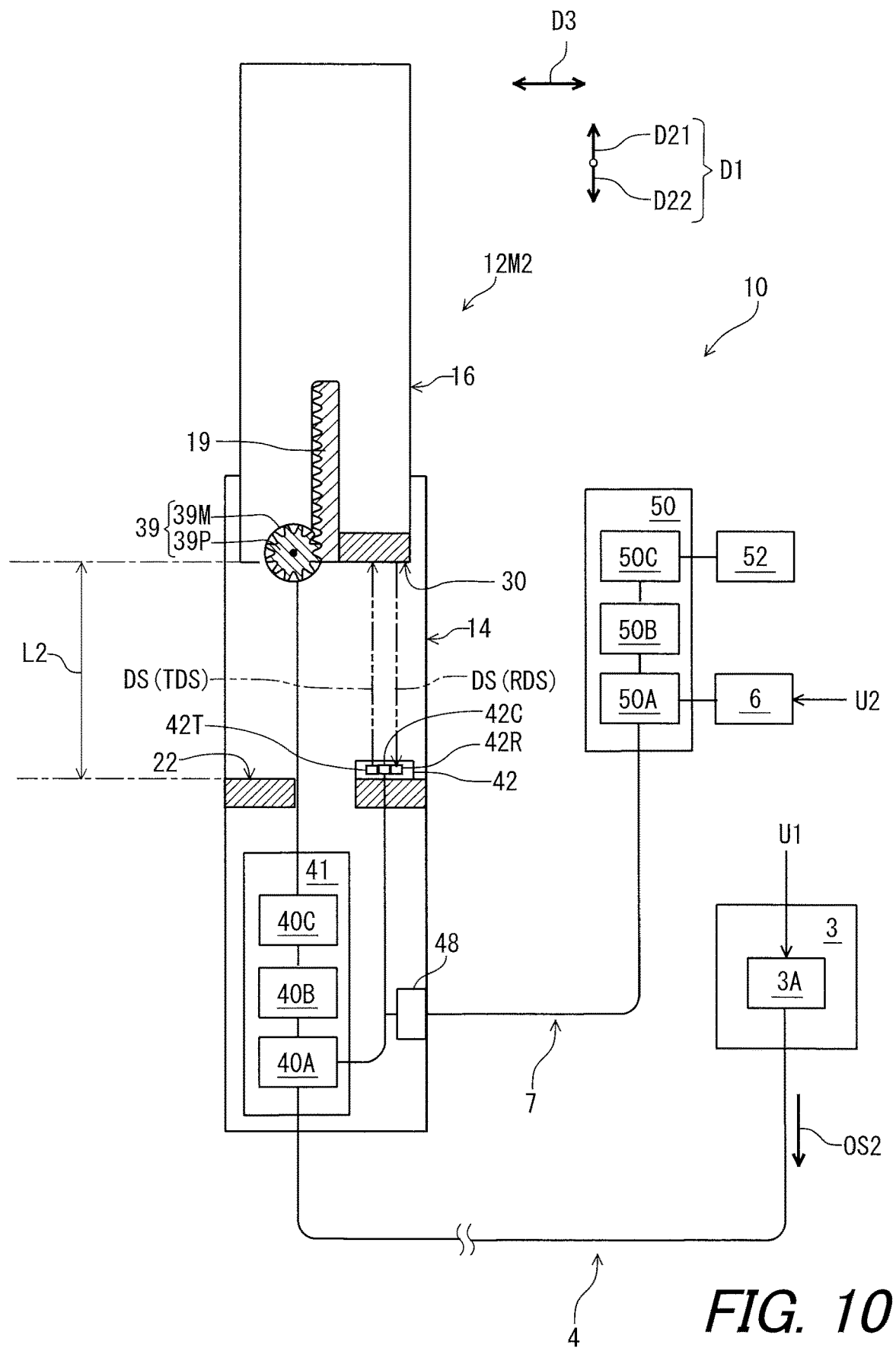
FIG. 10 is another example of the telescopic apparatus in accordance with another modification of the first embodiment.

Further, in the above embodiment, the actuator 38 can move the movable member 18 to change a state of the hydraulic structure 20 in order to change the total length L1 of the telescopic apparatus 12. However, the hydraulic structure 20 can be omitted in the telescopic apparatus 12, and the actuator 38 can directly control the position of the second tube 16 relative to the first tube 14. A telescopic apparatus 12M2 in accordance with one example of a modification of the first embodiment will be described below referring to FIG. 10. In this modification, the bicycle component control system 10 comprises the telescopic apparatus 12M2, an operating device 3, and an actuation controller 41 in place of the telescopic apparatus 12, the operating device 2, and the actuation controller 40, respectively. The operating device 3 includes an operating device 3A (e.g. a lever, two switches, or the like) to input a target position of the second tube 16 relative to the first tube 14. For example, the target position can be set by continuously pushing one switch to increase or decrease the total length L1 of the telescopic apparatus 12M. The operating device 3 is configured to transmit an operating signal OS2 indicating the target position of the second tube 16 relative to the first tube 14. The telescopic apparatus 12M includes an actuator 39 and a rack 19 fixed to the second tube 16 in place of the movable member 18 and the hydraulic structure 20. The actuator 39 includes a motor 39M and a pinion 39P to be rotated by the motor 39M. The actuation controller 41 is electrically connected to the actuator 39 to control the actuator 39 to rotate the pinion 39P in accordance with the target position indicated in the operating signal OS2. Other features in the telescopic apparatus 12M are same as those in the telescopic apparatus 12.

Figure 11:
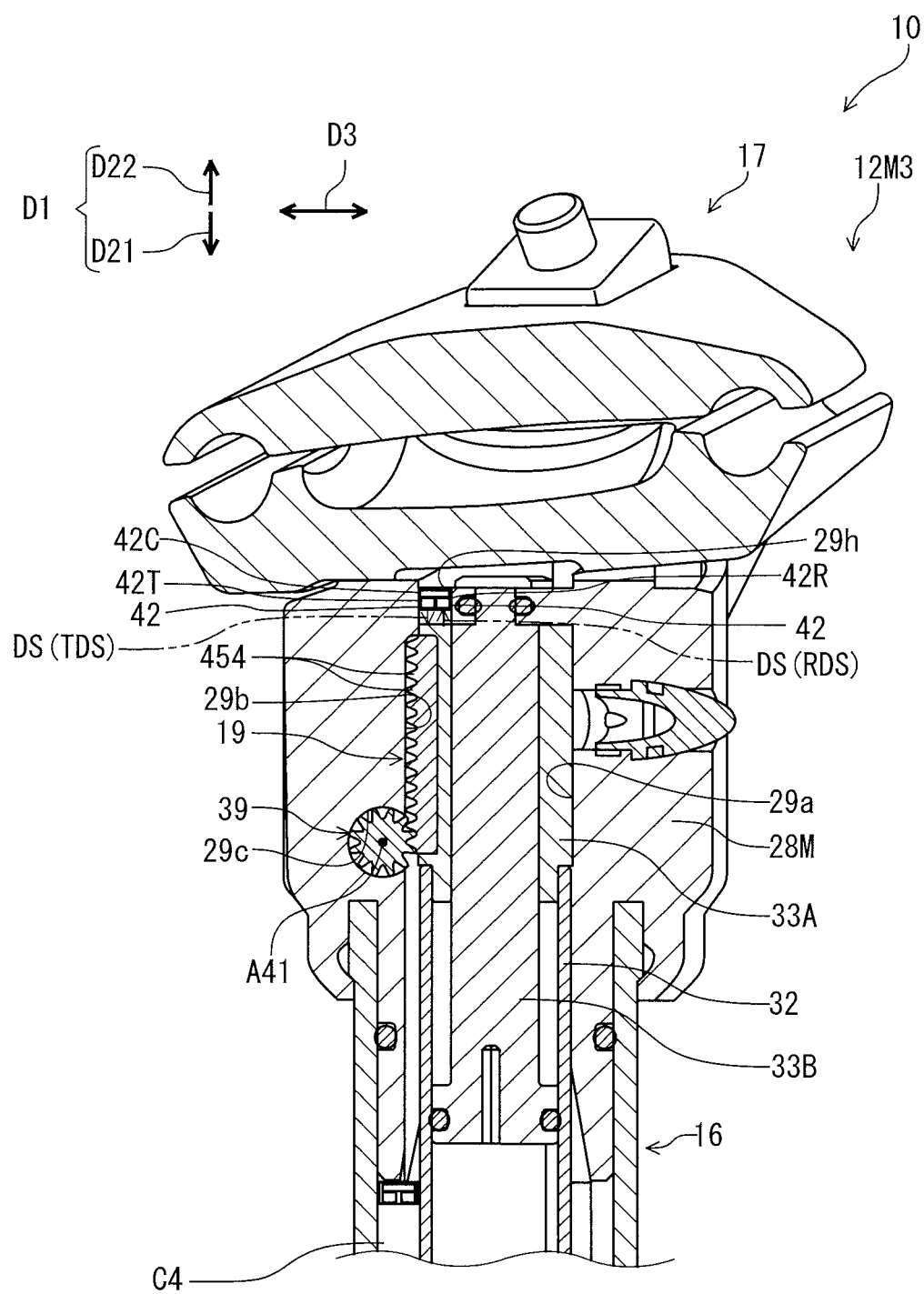
FIG. 11 is further example of the telescopic apparatus in accordance with further modification of the first embodiment.

Further, the non-contact detector 42 may detect a distance which is not directly related to the position of the second tube 16 relative to the first tube 14. FIG. 11 shows the telescopic apparatus 12M3 which is an example of such telescopic apparatus. A specific structure of the telescopic apparatus 12M3 is described in the United States Patent Application Publication 2015/0239517 A1. In this modification, the rack 19 and the actuator 39 are provided in the second support 28M. A tubular member 33A is secured to an end of the second inner tube 32. The rack 19 is secured to the tubular member 33A. In this modification, the second inner tube 32, the rack 19, and the tubular member 33A are movable relative to the second support in the telescopic movement direction D1. The second support 28M includes a first guide hole 29a, a guide groove 29b, and a second guide hole 29c. The tubular member 33A is provided in the first guide hole 29a. The rack 19 is provided in the guide groove 29b. The actuator 39 is provided in the second guide hole 29c. Further, the telescopic apparatus 12M3 includes a guide member 33B provided in the second inner tube 32 and the tubular member 33A. The guide member 33B is secured to the second support 28M to guide the second inner tube 32 and the tubular member 33A. In this modification, there is a recess in the second inner tube 32. When the second inner tube 32 and the tubular member 33A are moved due to rotation of the actuator 39, the position of the recess is moved, thereby a range of the total length L1 of the telescopic apparatus 12M3 between the maximum total length L11 and the minimum total length L12 is changed. In this modification, the second support 28M has an installation hole 29h in which the non-contact detector 42 is provided. Accordingly, the non-contact detector is provided in the second tube 16. As shown in FIG. 11, the non-contact detector 42 faces an upper end of the tubular member 33A. The non-contact detector 42 is configured to transmit the detecting signal DS along the telescopic movement direction D1 of the telescopic apparatus 12M3. The transmitter 42T is configured to transmit the detecting signal DS to the receiver 42R along a first direction D21. The first direction D21 is parallel to the telescopic movement direction D1 of the second tube 16 relative to the first tube 14. The detecting signal DS transmitted from the transmitter 42T is reflected towards a second direction D22 so as to be received by the receiver 42R. The second direction D22 is opposite to the first direction D21. The transmitter 42T and the receiver 42R are disposed along a third direction D3. The third direction D3 is perpendicular to the telescopic movement direction D1 of the second tube 16 relative to the first tube 14.

Second Embodiment

A bicycle component control system 110 comprising a telescopic apparatus 112 in accordance with a second embodiment will be described below referring to FIG. 12. The bicycle component control system 110 has the same structure and/or configuration as those of the bicycle component control system 10 except that the telescopic apparatus 112 is a suspension apparatus. Thus, elements having substantially the same function as those in the first embodiment will be numbered the same here and will not be described and/or illustrated again in detail here for the sake of brevity. In this embodiment, the telescopic apparatus 112 can be referred to as the suspension apparatus 112. An example of a specific structure of the telescopic apparatus 112 is described in the U.S. Pat. No. 9,481,425 B2.

Figure 12:
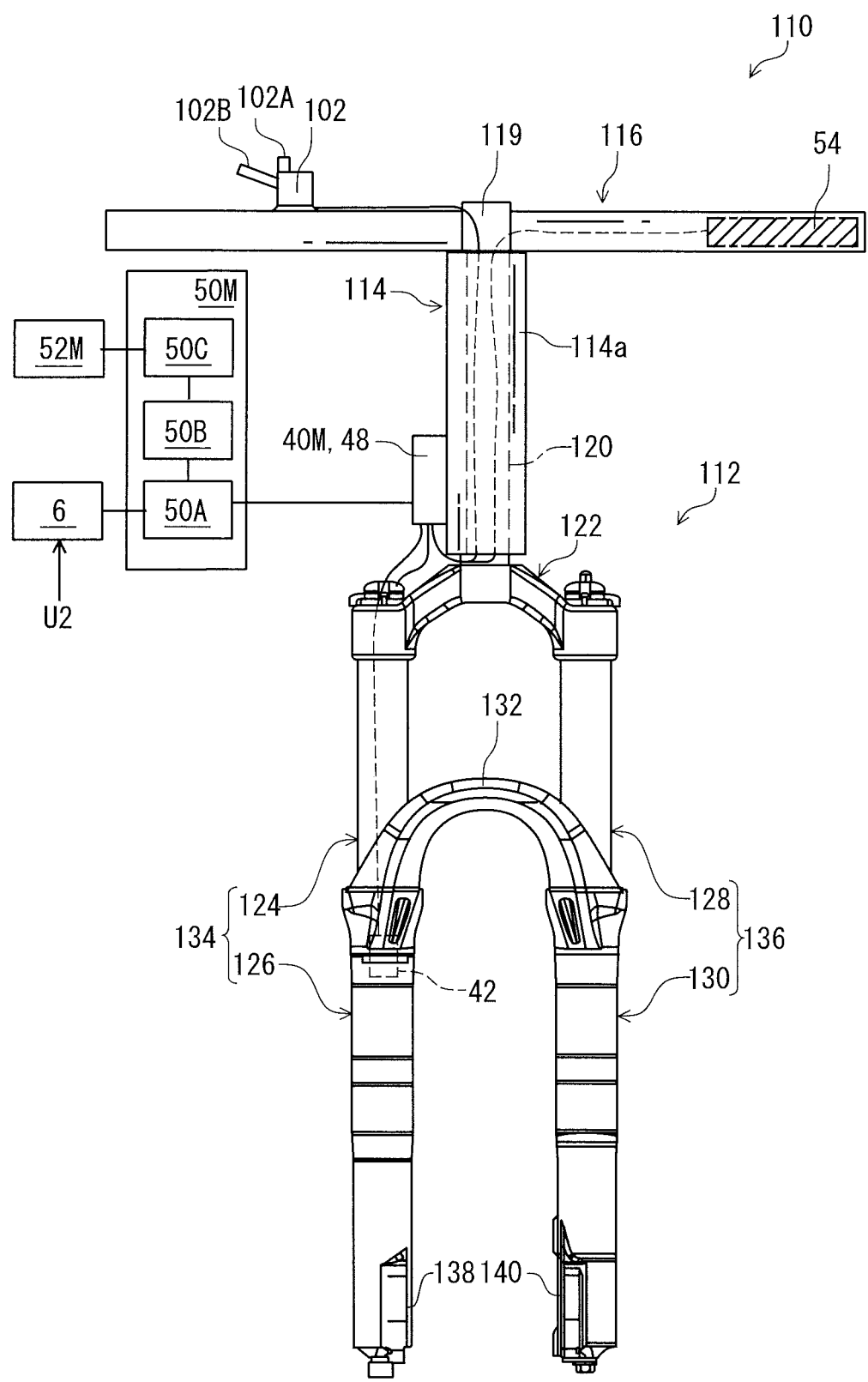
FIG. 12 is a schematic elevation front view of a telescopic apparatus in accordance with a second embodiment, with a schematic block diagram of a bicycle component control system.

In the illustrated embodiment, as seen in FIG. 12, the telescopic apparatus 112 is incorporated into (or otherwise define) a front-fork of a bicycle. However, the telescopic apparatus 112 may be alternatively (or additionally) utilized as or part of a rear suspension assembly and, thereby, may include other components corresponding to these other suspension assembly configurations. An upper end of the telescopic apparatus 112 is rotatably mounted to a head tube 114a of the bicycle frame 114. The handlebar 116 is secured to the upper end of the telescopic apparatus 112 via a stem 119.

As seen in FIG. 12, the telescopic apparatus 112 comprises a steerer tube 120 and an upper connecting member 122. The steerer tube 120 is rotatably mounted to the head tube 114a of the bicycle frame 114. Au upper end of the steerer tube 120 is coupled to the handlebar 116 via the stem 119. A lower end of the steerer tube 120 is secured to the upper connecting member 122.

The telescopic apparatus 112 further comprises a first upper cylinder (or a cylinder element) 124, a first lower cylinder 126, a second upper cylinder 128, a second lower cylinder 130, and a lower connecting member 132. An upper end of the first upper cylinder 124 is secured to the upper connecting member 122. An upper end of the second upper cylinder 128 is secured to the upper connecting member 122. The first lower cylinder 126 includes a first supporting portion 138. The second lower cylinder 130 includes a second supporting portion 140. The first supporting portion 138 and the second supporting portion 140 rotatably support a front wheel. The lower connecting member 132 connects the first lower cylinder 126 and the second lower cylinder 130 to provide strength and minimize twisting thereof. In the illustrated embodiment, the first lower cylinder 126, the second lower cylinder 130 and the lower connecting member 132 are formed as a single unitary member.

The first upper cylinder 124 is telescopically received in the first lower cylinder 126. Therefore, the first upper cylinder 124 can correspond to the first tube 14 in the first embodiment. The first lower cylinder 126 can correspond to the second tube 16 in the first embodiment. Accordingly, the first upper cylinder 124 can be referred to as the first tube 124. The first lower cylinder 126 can be referred to as the second tube 126. The telescopic apparatus 112 (the suspension apparatus 112) comprises the first tube 124 and the second tube 126. The first upper cylinder 124 and the first lower cylinder 126 constitute a part of a first shock absorber 134 configured to expand and contract for absorbing shocks while riding the bicycle over rough terrain. The first shock absorber 134 is configured to provide resistance to compression of the telescopic apparatus 112 and configured to release stored energy during compression to cause the telescopic apparatus 112 to expand (or rebound).

The second upper cylinder 128 is telescopically received in the second lower cylinder 130. Therefore, the second upper cylinder 128 can correspond to the first tube 14 in the first embodiment. The second lower cylinder 130 can correspond to the second tube 16 in the first embodiment. Accordingly, the second upper cylinder 128 can be referred to as the first tube 128. The second lower cylinder 130 can be referred to as the second tube 130. Accordingly, it can be also depicted that the telescopic apparatus 112 (the suspension apparatus 112) comprises the first tube 128 and the second tube 130. The second upper cylinder 128 and the second lower cylinder 130 constitute a part of a second shock absorber 136 configured to expand and contract for absorbing shocks while riding the bicycle over rough terrain. The second shock absorber 136 is configured to provide damping force which resists both compression and rebound of the telescopic apparatus 112 and, thereby, configured to regulate rate of compression and rebound of the telescopic apparatus 112.

Figure 13:
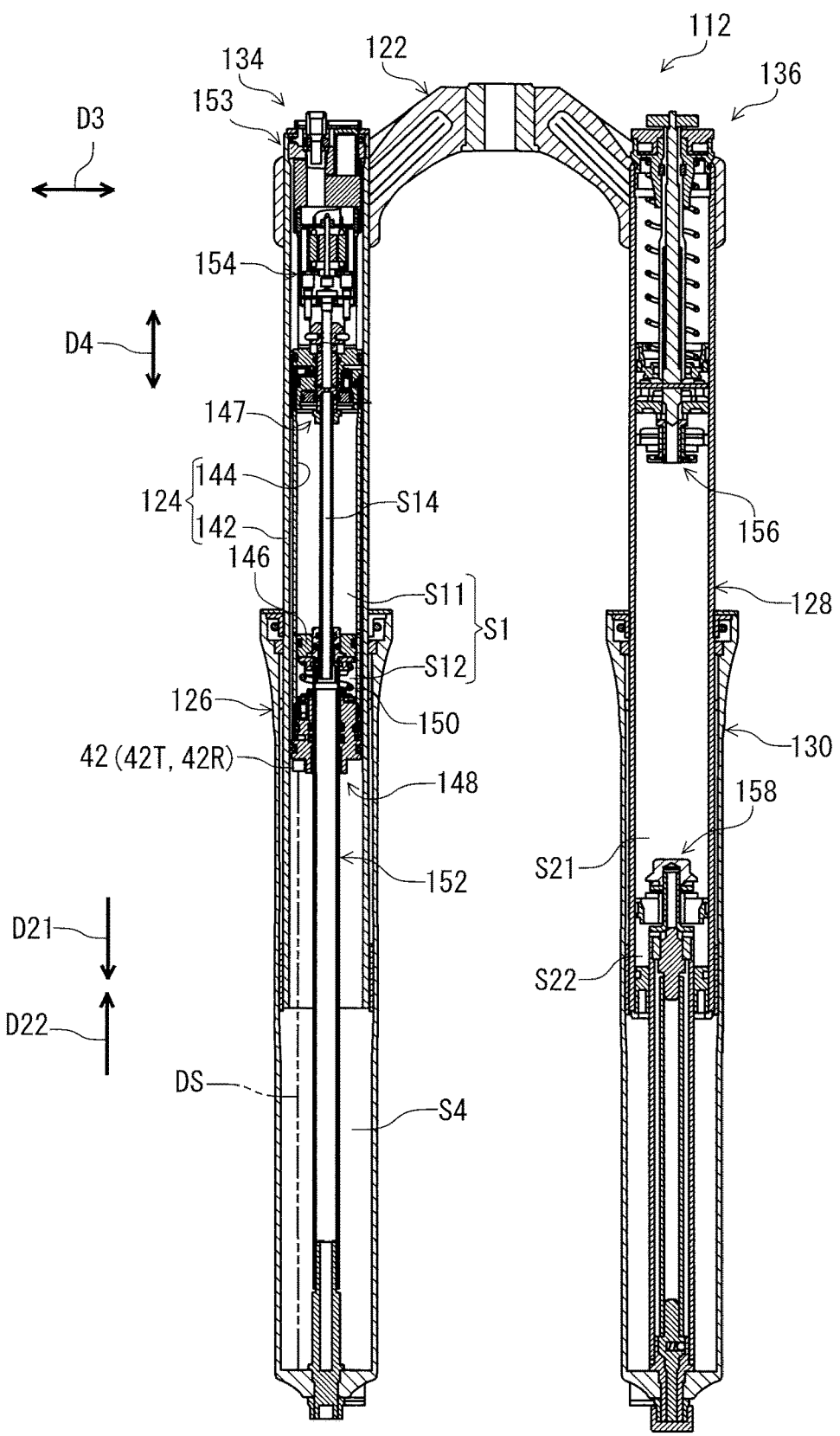
FIG. 13 is a longitudinal cross-sectional view of the telescopic apparatus illustrated in FIG. 12.

As seen in FIG. 13, the first upper cylinder (or the cylinder element) 124 of the first shock absorber 134 includes an internal space S1 extending in an axial direction D4 of the first upper cylinder 124. More specifically, the first upper cylinder 124 includes an outer tube member 142 and an inner tube member 144. The outer tube member 142 and the inner tube member 144 extend in the axial direction D4. The inner tube member 144 is provided in the outer tube member 142. The internal space S1 is defined in the outer tube member 142 and the inner tube member 144.

The telescopic apparatus 112 further comprises a piston (or a piston element) 146 and a stroke adjustment structure 154. In addition, the telescopic apparatus 112 may comprise an upper sealing structure 147, a lower sealing structure 148, a coil spring 150, a lower tube part 152, and a cover member 153. The piston (or the piston element) 146 is provided in the internal space S1 to define a first air chamber S11 and a second air chamber S12 in the first upper cylinder (or the cylinder element) 124. The second air chamber S12 is opposite to the first air chamber S11 with respect to the piston (or the piston element) 146. The first air chamber S11 defines a positive air chamber of the telescopic apparatus 112. The second air chamber S12 defines a negative air chamber of the telescopic apparatus 112.

The piston 146 is provided in the inner tube member 144 of the first upper cylinder 124. The piston 146 is relatively slidable with respect to an inner peripheral surface of the inner tube member 144 in the axial direction D4. The upper sealing structure 147 is secured to an upper end of the inner tube member 144. A part of the first air chamber S11 is defined by the inner tube member 144, the piston 146 and the upper sealing structure 147. The lower sealing structure 148 is secured to a lower end of the inner tube member 144. The second air chamber S12 is defined by the inner tube member 144, the piston 146 and the lower sealing structure 148.

The coil spring 150 is provided between the piston 146 and the lower sealing structure 148 in the second air chamber S12. The coil spring 150 is compressed between the piston 146 and the lower sealing structure 148 in an initial state where weight of the bicycle frame 114 or other bicycle components is applied to the telescopic apparatus 112.

The lower tube part 152 extends in the axial direction D4 and connects the piston 146 to the first lower cylinder 126. More specifically, an upper end of the lower tube part 152 is secured to the piston 146. A lower end of the lower tube part 152 is secured to the first lower cylinder 126. The lower tube part 152 is relatively slidable with respect to the lower sealing structure 148. The piston 146, the lower tube part 152 and the first lower cylinder 126 are movable relative to the first upper cylinder 124 and the lower sealing structure 148 in the axial direction D4.

As seen in FIG. 13, the cover member 153 is secured to the upper end of the first upper cylinder 124. More specifically, the cover member 153 is secured to an upper end of the outer tube member 142. The first air chamber S11 is defined between the piston 146 and the cover member 153 in the first upper cylinder 124. A part of the first air chamber S11 is defined between the piston 146 and the upper sealing structure 147 in the inner tube member 144. A part of the first air chamber S11 is defined between the cover member 153 and the upper sealing structure 147 in the outer tube member 142.

The stroke adjustment structure 154 is configured to adjust a stroke of the telescopic apparatus 112. The stroke adjustment structure 154 is provided in the first air chamber S11. More specifically, the stroke adjustment structure 154 is provided between the cover member 153 and the upper sealing structure 147 in the first upper cylinder 124. The stroke adjustment structure 154 is provided inside the outer tube member 142 of the first upper cylinder 124. The stroke adjustment structure 154 will be described in detail later.

The second shock absorber 136 of the telescopic apparatus 112 includes an upper adjustable dampening assembly 156 and a lower adjustable dampening assembly 158. The upper adjustable dampening assembly 156 is provided in the second upper cylinder 128. The lower adjustable dampening assembly 158 is provided in the second upper cylinder 128 and the second lower cylinder 130. The second shock absorber 136 further includes a first fluid chamber S21 and a second fluid chamber S22 which are filled with fluid such as oil. The upper adjustable dampening assembly 156 and the lower adjustable dampening assembly 158 are configured to change the damping force which resists both compression and rebound of the telescopic apparatus 112. Since the structures of the second shock absorber 136 has been known, they will not be described in detail here for the sake of brevity.

Figures 15, 16:
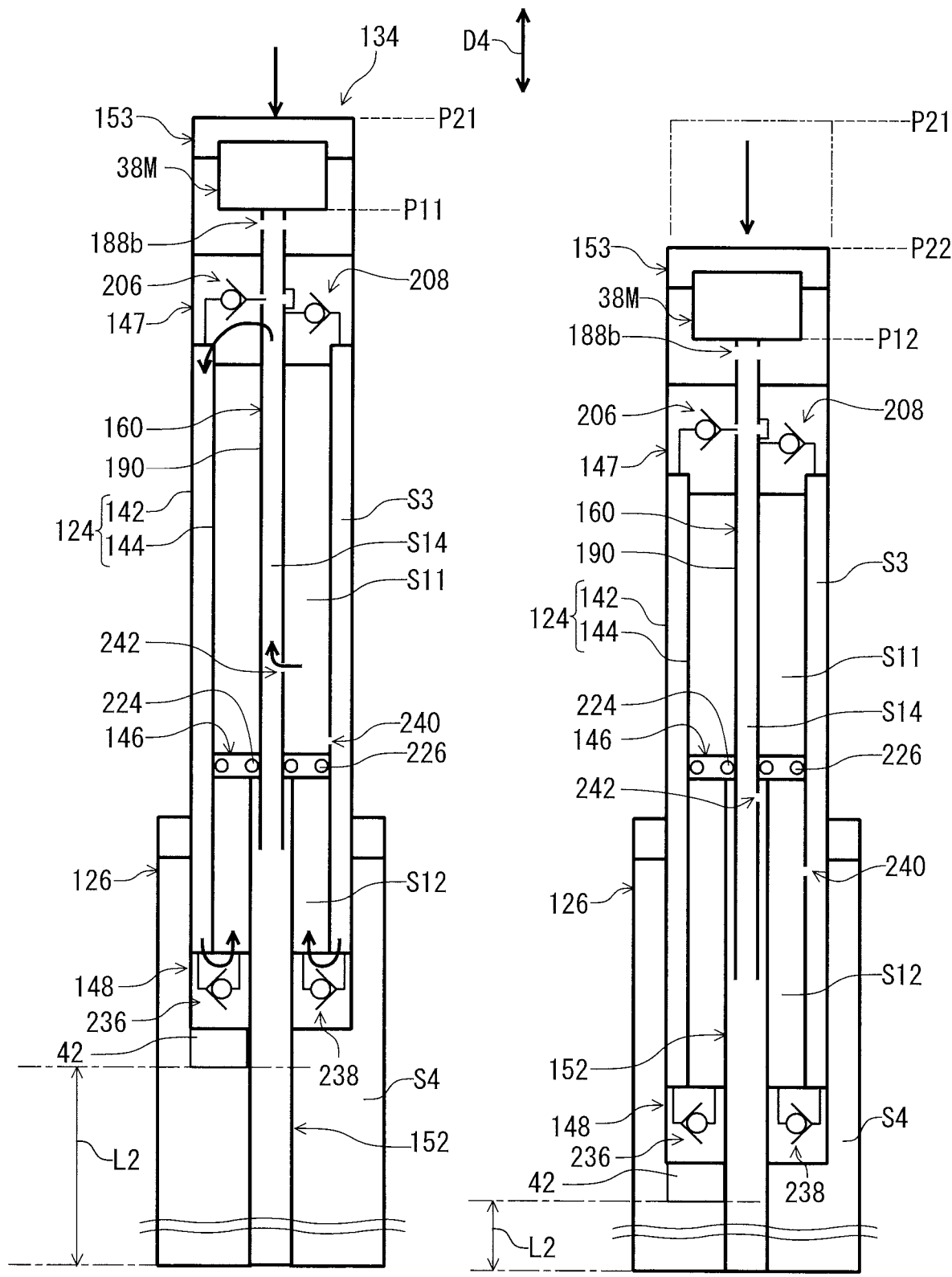
FIG. 15 is a schematic diagram of a first shock absorber of the telescopic apparatus illustrated in FIG. 12 (long-stroke state).
FIG. 16 is a schematic diagram of the first shock absorber of the telescopic apparatus illustrated in FIG. 12 (short-stroke state).

As seen in FIG. 15, the stroke adjustment structure 154 of the first shock absorber 134 includes an axially movable member 160. The stroke adjustment structure 154 of the first shock absorber 134 further includes an actuator 38M. The axially movable member 160 is configured to initiate a stroke adjustment of the telescopic apparatus 112. The actuator 38M is configured to operate the axially movable member 160. The axially movable member 160 is movable between a long-stroke position P11 and a short-stroke position P12 relative to the first upper cylinder 124. The telescopic apparatus 112 further comprises the actuator 38M provided in the at least one of the first tube 124 and the second tube 126. More specifically, the telescopic apparatus 112 further comprises the actuator 38M provided in the first tube 124. The actuator 38M is configured to move the axially movable member 160 between the long-stroke position P11 and the short-stroke position P12 relative to the first upper cylinder 124. The actuator 38M comprises a motor and may further comprise a transmitting structure.

The actuator 38M is preferably configured to be entirely disposed in the first air chamber S11. The axially movable member 160 is configured to be entirely disposed in the first air chamber S11. The first air chamber S11 can be in fluid communication with the inside passage S14 via the communication passage 188b. The inside passage S14 is defined in the axially movable member 160 and the lower tube part 152 (FIG. 13).

As seen in FIG. 15, an intermediate passage S3 is defined between the outer tube member 142 and the inner tube member 144. The intermediate passage S3 downward extends in the axial direction D4 from the upper sealing structure 147. The first air chamber S11 and the intermediate passage S3 are sealed therebetween. An upper portion of the first air chamber S11 and the outside of the telescopic apparatus 112 are sealed therebetween.

The upper sealing structure 147 is configured to switch a state of fluid communication between the first air chamber S11 and the second air chamber S12. The upper sealing structure 147 includes a first check valve 206 and a second check valve 208. The first check valve 206 is configured to allow air to flow from the first air chamber S11 to the second air chamber S12 and configured to prevent air from flowing from the second air chamber S12 to the first air chamber S11. The second check valve 208 is configured to allow air to flow from the second air chamber S12 to the first air chamber S11 and configured to prevent air from flowing from the first air chamber S11 to the second air chamber S12.

The lower tube part 152 is secured to the piston 146. The lower tube part 152 is relatively slidable with respect to the lower sealing structure 148 (an example of a seal) in the axial direction D4. The second air chamber S12 and a lower chamber S4 are sealed therebetween. The lower chamber S4 is defined by the lower sealing structure 148 and the outer tube member 142. The second air chamber S12 and the intermediate passage S3 are sealed therebetween. The intermediate passage S3 and the lower chamber S4 are sealed therebetween.

The lower sealing structure 148 includes a third check valve 236 and a fourth check valve 238. Each of the third check valve 236 and the fourth check valve 238 is configured to allow air to flow from the intermediate passage S3 to the second air chamber S12 and configured to prevent air from flowing from the second air chamber S12 to the intermediate passage S3.

As seen in FIG. 15, the inner tube member 144 includes a first communication passage 240 configured to connect the intermediate passage S3 to one of the first air chamber S11 and the second air chamber S12. In the long-stroke state of the telescopic apparatus 112, the first communication passage 240 is located above an outer seal ring 226 in the axial direction D4 to connect the intermediate passage S3 to the first air chamber S11. In the short-stroke state of the telescopic apparatus 112, the first communication passage 240 is located below the outer seal ring 226 in the axial direction D4 to connect the intermediate passage S3 to the second air chamber S12.

The upper tube part 190 includes a second communication passage 242 configured to connect the inside passage S14 of the upper tube part 190 to one of the first air chamber S11 and the second air chamber S12. In the long-stroke state of the telescopic apparatus 112, the axially movable member 160 is located at the long-stroke position P11, and the second communication passage 242 is located above an inner seal ring 224 in the axial direction D4 to connect the inside passage S14 of the upper tube part 190 to the first air chamber S11. In the short-stroke state of the telescopic apparatus 112, the axially movable member 160 is located at the short-stroke position P12 (FIG. 16), and the second communication passage 242 is located below the inner seal ring 224 in the axial direction D4 to connect the inside passage S14 of the upper tube part 190 to the second air chamber S12.

Figure 14:
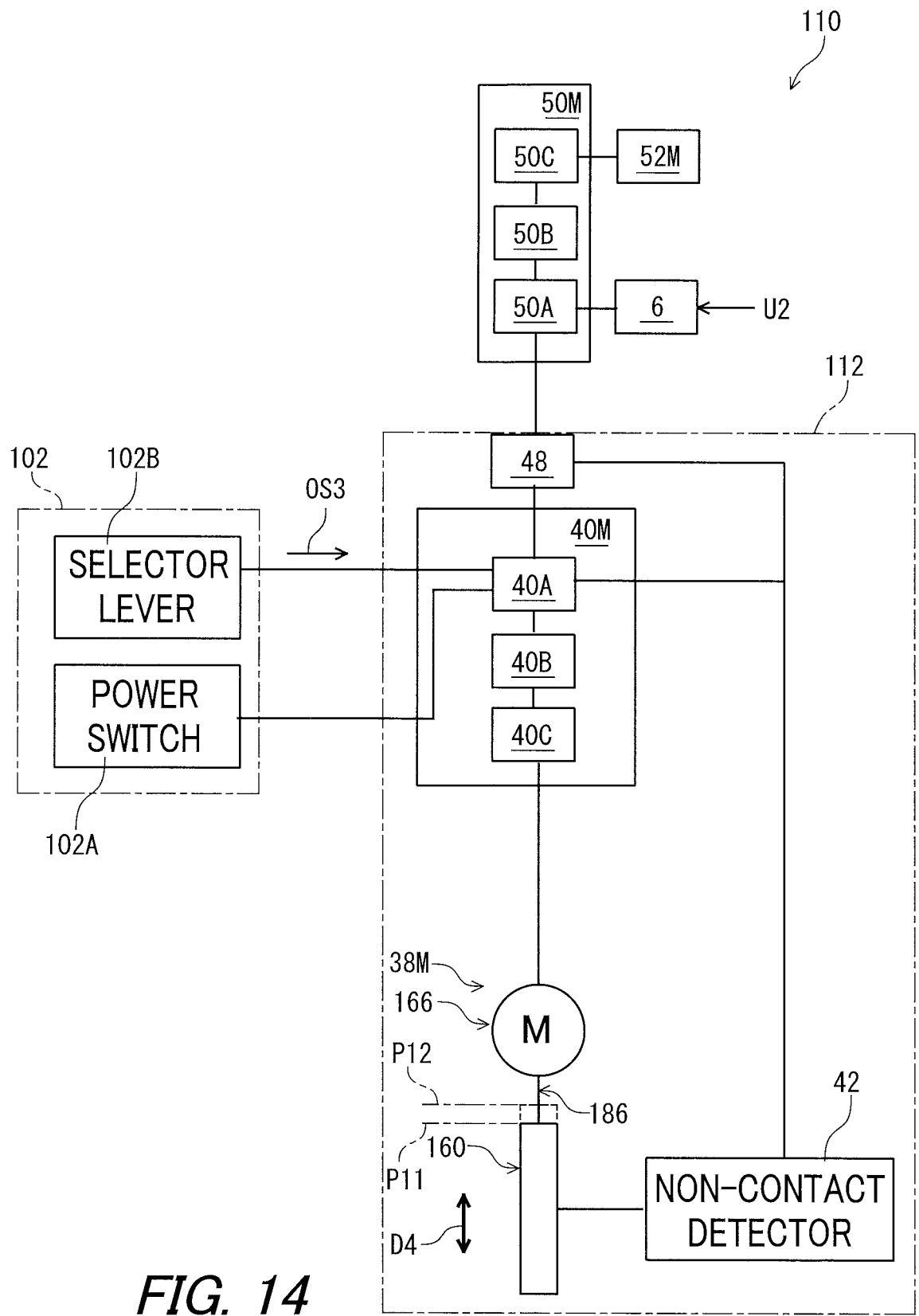
FIG. 14 is a schematic block diagram of a bicycle component control system including the telescopic apparatus illustrated in FIG. 12.

Referring to FIG. 14, the bicycle component control system 110 comprises the telescopic apparatus 112, an operating device 102, and a controller 50M. The telescopic apparatus 112 includes an actuation controller 40M configured to switch a state of the telescopic apparatus 112 between the long-stroke state and the short-stroke state of the telescopic apparatus 112. More specifically, the actuation controller 40M is configured to control the actuator 38M of the stroke adjustment structure 154 to move the axially movable member 160 between the long-stroke position P11 and the short-stroke position P12. Further, the telescopic apparatus 112 comprises the non-contact detector 42 as explained in the first embodiment. The actuation controller 40M has substantially the same hardware structure, but the processor 40A execute a different program from that explained in the first embodiment.

The operating device 102 is mounted on the handlebar and includes a power switch 102A and a selector lever 102B. The power switch 102A is configured to allow a rider to turn on or off the bicycle component control system 110 and the actuator 38M. The selector lever 102B is further configured to allow the rider to select one of the long-stroke state and the short-stroke state of the telescopic apparatus 112 to transmit an operating signal OS3 indicating the state selected by the rider to the actuation controller 40M. The processor 40A of the actuation controller 40M is configured to output commands corresponding to the long-stroke state and the short-stroke state based on an output from the selector lever 102B. The actuator driver 40C of the actuation controller 40M is configured to generate driving pulses based on the commands output from the processor 40A to operate the actuator 38M. The actuator 38M is configured to rotate the output portion 186 in accordance with the driving pulses to move the axially movable member 160 in the axial direction D4. The non-contact detector 42 is configured to detect a position of the second tube 126 relative to the first tube 124 to detect whether the axially movable member 160 is located at the long-stroke position P11 or the short-stroke position P12. The processor 40A of the actuation controller 40M is configured to output commands to stop the actuator 38M based on a detection result from the non-contact detector 42.

As seen in FIG. 12, a battery 54 is mounted in the handlebar 116 and is configured to supply power to the bicycle component control system 110. The operating device 102 is mounted on the handlebar 116. The actuation controller 40M is attached to the head tube 114a. The non-contact detector 42 is mounted in both the first upper cylinder 124 and the first lower cylinder 126. Accordingly, the non-contact detector 42 is provided inside at least one of the first tube 124 and the second tube 126.

As seen in FIG. 13, the non-contact detector 42 is provided on a lower end of the lower sealing structure 148. Alternatively, the non-contact detector 42 can be provided on a bottom end of the first lower cylinder 126 (the second tube 126). As seen in FIG. 11, the transmitter 42T is configured to transmit the detecting signal DS to the receiver 42R along a first direction D21 to detect the second tube 126 relative to the first tube 124. The first direction D21 is parallel to the axial direction D4. The detecting signal DS transmitted from the transmitter 42T is reflected towards a second direction D22 so as to be received by the receiver 42R. The second direction D22 is opposite to the first direction D21. Similarly to the first embodiment, the transmitter 42T and the receiver 42R are disposed along a third direction D3 perpendicular to the axial direction D4. However, the transmitter 42T and the receiver 42R can be integrated into a single integrated transmitter/receiver as described in the first embodiment. How to detect whether the axially movable member 160 is located at the long-stroke position P11 or the short-stroke position P12 based on the position of the second tube 126 relative to the first tube 124 detected by the non-contact detector 42 is explained below.

Referring to FIGS. 15 to 18, the operations of the telescopic apparatus 112 will be described in detail. As seen in FIG. 15, the first upper cylinder 124 is located at a long-stroke position P21 relative to the first lower cylinder 126 in the long-stroke state of the telescopic apparatus 112. When the rider selects the short-stroke state using the selector lever 102B of the operating device 102 in the long-stroke state, the axially movable member 160 is moved by the actuator 38M from the long-stroke position P11 to the short-stroke position P12. As a result, the first air chamber S11 is in fluid communication with the intermediate passage S3 via the second communication passage 242, the inside passage S14 of the upper tube part 190 and the first check valve 206. The intermediate passage S3 is in fluid communication with the third check valve 236 and the fourth check valve 238. When the rider downward presses the first upper cylinder 124, air flows from the first air chamber S11 to the second air chamber S12 via the inside passage S14 and the intermediate passage S3, causing the first upper cylinder 124 to downward move relative to the first lower cylinder 126 in the axial direction D4. Accordingly, the axial direction D4 can be referred to as a telescopic movement direction D4 of the second tube 126 relative to the first tube 124. The first direction D21 (FIG. 13) is parallel to the telescopic movement direction D4 of the second tube 126 relative to the first tube 124. The third direction D3 (FIG. 13) is perpendicular to the telescopic movement direction D4 of the second tube 126 relative to the first tube 124.

As seen in FIG. 16, when the second communication passage 242 downward passes through the inner seal ring 224 provided in the piston 146, air is prevented from flowing from the first air chamber S11 to the second air chamber S12 via the inside passage S14 and the intermediate passage S3. This causes the first upper cylinder 124 to stop at a short-stroke position P22 relative to the first lower cylinder 126. Accordingly, an initial total length of the telescopic apparatus 112 can be decreased. Therefore, the actuator 38M is configured to telescopically position the second tube 126 relative to the first tube 124. The selector lever 102B of the operating device 102 can be set to the short-stroke state to decrease the initial total length of the telescopic apparatus 112. Accordingly, the operating device 102 is configured to transmit the operating signal OS3 indicating a target position of the second tube 126 relative to the first tube 124. In addition, since the initial total length of the telescopic apparatus 112 is decreased, the distance L2 that the non-contact detector 42 can detect is decreased. Accordingly, the non-contact detector 42 can detect whether the axially movable member 160 is located at the short-stroke position P12 based on the distance L2 (the position of the second tube 126 relative to the first tube 124 detected by the non-contact detector 42).

Figure 17:
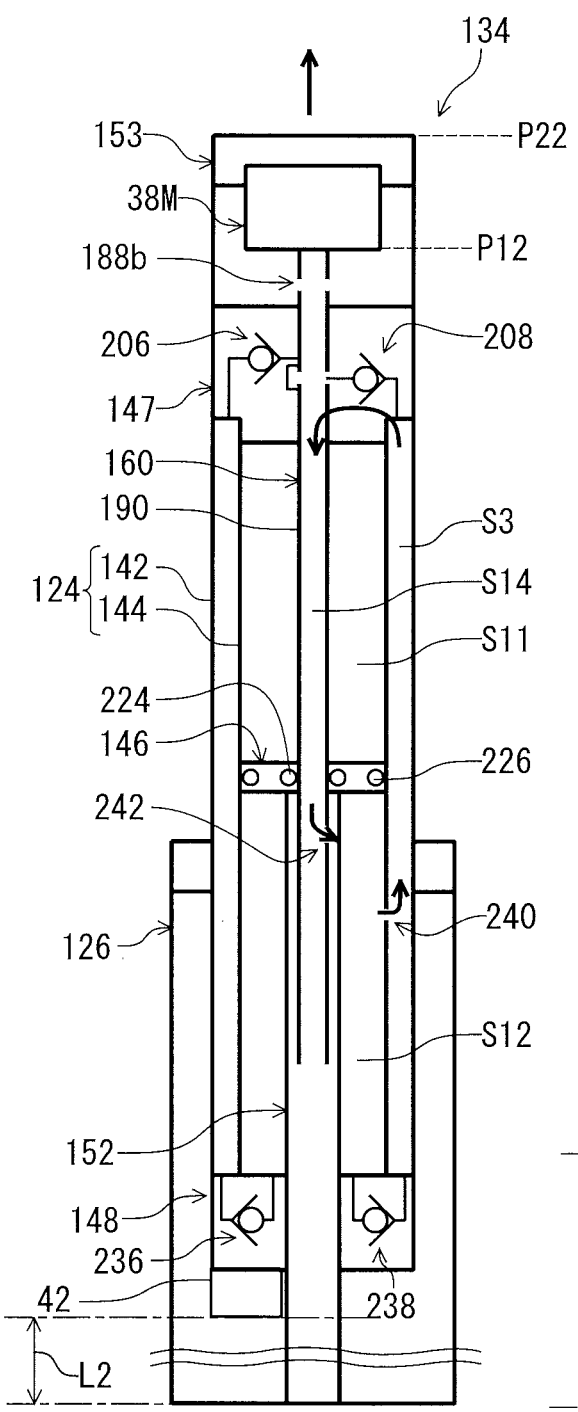
FIG. 17 is a schematic diagram of the first shock absorber of the telescopic apparatus illustrated in FIG. 12 (short-stroke state).

As seen in FIG. 17, when the rider selects the long-stroke state using the selector lever 202B of the operating device 102 in the short-stroke state of the telescopic apparatus 112, the axially movable member 160 is moved by the actuator 38M from the long-stroke position P11 to the short-stroke position P12. As a result, the second air chamber S12 is in fluid communication with the inside passage S14 of the upper tube part 190 and the lower tube part 152 via the first communication passage 240, the intermediate passage S3 and the second check valve 208. In the short-stroke state, a pressure of the second air chamber S12 is higher than a pressure of the second air chamber S12 in the long-stroke state. Accordingly, air naturally flows from the second air chamber S12 to the first air chamber S11 via the intermediate passage S3 and the inside passage S14, causing the first upper cylinder 124 to upward move relative to the first lower cylinder 126.

Figure 18:
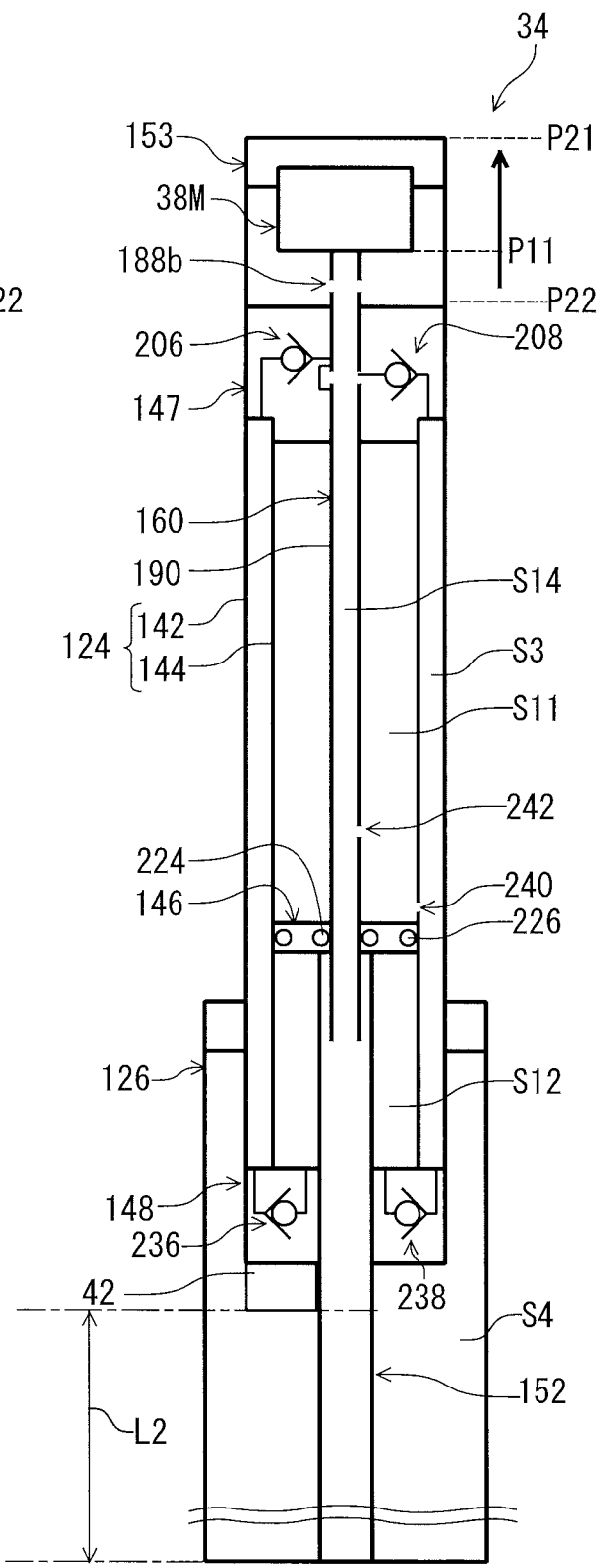
FIG. 18 is a schematic diagram of a first shock absorber of the telescopic apparatus illustrated in FIG. 12 (long-stroke state).

As seen in FIG. 18, when the first communication passage 240 upward passes through the outer seal ring 226 of the piston 146, air is prevented from flowing from the second air chamber S12 to the first air chamber S11 via the intermediate passage S3 and the inside passage S14. This causes the first upper cylinder 124 to stop at the long-stroke position P21 relative to the first lower cylinder 126. Accordingly, an initial total length of the telescopic apparatus 112 can be increased. Therefore, the actuator 38M is configured to telescopically position the second tube 126 relative to the first tube 124. The selector lever 102B of the operating device 102 can be set to the long-stroke state to increase the initial total length of the telescopic apparatus 112. Accordingly, the operating device 102 is configured to transmit the operating signal OS3 indicating a target position of the second tube 126 relative to the first tube 124. In addition, since the initial total length of the telescopic apparatus 112 is increased, the distance L2 that the non-contact detector 42 can detect is increased. Accordingly, the non-contact detector 42 can detect whether the axially movable member 160 is located at the long-stroke position P11 based on the distance L2 (the position of the second tube 126 relative to the first tube 124 detected by the non-contact detector 42).

In the second embodiment, the controller 50M in FIG. 18 can be the actuation controller 41 in the modification of the first embodiment. The controller 50M is configured to receive the position detected by the non-contact detector 42 in order to control at least one bicycle component (the telescopic apparatus 12M2) other than the telescopic apparatus 112. For example, the controller 50M is configured to receive the position detected by the non-contact detector 42 to control the total length of the height adjustable seatpost 12M2 in accordance with the total length of the suspension apparatus 112.

Modifications

In the first and second embodiments, the non-contact detector 42 is disposed at a bottom end of the first tube 14

(124). However, the non-contact detector 42 can be disposed at a different place (e.g. a top end or a middle part) of the first tube 14 (124) or the second tube 16 (126).

In the first and second embodiments, each of the telescopic apparatuses 12, 12M, and 112 includes a height adjustable seatpost assembly or a telescopic apparatus. However, the structures of the telescopic apparatuses 12, 12M, and 112 can apply to another apparatus other than an apparatus for a human powered vehicle.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A height adjustable seatpost comprising:
   a first tube;
   a second tube telescopically received in the first tube;
   a hydraulic structure provided in the second tube and having an open state where the second tube is movable with respect to the first tube in a telescopic movement direction and a closed state where the first tube and the second tube are fixedly positioned relative to each other in the telescopic movement direction;
   a movable member movable relative to the first tube to change a state of the hydraulic structure between the open state and the closed state;
   a reflective member provided on one of the first tube and the second tube; and
   a non-contact detector provided on another of the first tube and the second tube opposite to the reflective member in the telescopic movement direction and configured to detect a distance between the non-contact detector and the reflective member in the telescopic movement direction, the distance corresponding to a position of the second tube relative to the first tube, the non-contact detector including:
   a transmitter to transmit a detecting signal, and
   a receiver to receive the detecting signal that is reflected by the reflective member, wherein
   the first tube has a first internal space within the first tube, and
   both the reflective member and the non-contact detector are provided in the first internal space.

2. The height adjustable seatpost according to claim 1, wherein
   the non-contact detector is configured to detect the position based on a time required for transmission of the detecting signal between the transmitter and the receiver.

3. The height adjustable seatpost according to claim 1, wherein
   the detecting signal includes one of a laser and an ultrasonic wave.

4. The height adjustable seatpost according to claim 1, wherein
   the transmitter is configured to transmit the detecting signal to the receiver along a first direction to detect the position of the second tube relative to the first tube.

5. The height adjustable seatpost according to claim 4, wherein
   the first direction is parallel to the telescopic movement direction of the second tube relative to the first tube.

6. The height adjustable seatpost according to claim 4, wherein
   the detecting signal transmitted from the transmitter is reflected towards a second direction so as to be received by the receiver.

7. The height adjustable seatpost according to claim 6, wherein
   the second direction is opposite to the first direction.

8. The height adjustable seatpost according to claim 1, further comprising:
   an actuator being provided in at least one of the first tube and the second tube and configured to telescopically position the second tube relative to the first tube.

9. A bicycle component control system comprising:
   the height adjustable seatpost according to claim 1;
   an operating device configured to transmit an operating signal indicating a target position of the second tube relative to the first tube; and
   a controller configured to receive the position detected by the non-contact detector in order to control at least one bicycle component other than the telescopic apparatus.

10. A telescopic apparatus comprising:
    a first tube;
    a second tube configured to be telescopically received in the first tube; and
    a non-contact detector provided inside at least one of the first tube and the second tube configured to detect a position of the second tube relative to the first tube,
    the non-contact detector including:
    a transmitter to transmit a detecting signal; and
    a receiver to receive the detecting signal, wherein
    the transmitter and the receiver are disposed along a third direction perpendicular to a telescopic movement direction of the second tube relative to the first tube.

11. A telescopic apparatus comprising:
    a first cylinder including an outer tube member and an inner tube member, the inner tube member being provided within the outer tube member;

a second cylinder, the first cylinder being telescopically received in the second cylinder;

a piston fixed onto the second cylinder and within the inner tube member to partition an inner space of the inner tube member into a first air chamber and a second air chamber opposite to the first air chamber with respect to the piston, the first air chamber being communicable with the second air chamber via an intermediate passage defined between an outer surface of the inner tube member and an inner surface of the outer tube member;

a first sealing structure provided on a first end of the inner tube member to seal the first air chamber;

a second sealing structure provided on a second end the inner tube member to seal the second air chamber;

a reflective member provided on one of the first cylinder tube and the second sealing structure; and a non-contact detector provided on another of the first cylinder and the second sealing structure opposite to the reflective member in the telescopic movement direction and configured to detect a distance between the non-contact detector and the reflective member in the telescopic movement direction, the distance corresponding to a position of the second cylinder relative to the first tube, the non-contact detector including:

a transmitter to transmit a detecting signal, and a receiver to receive the detecting signal that is reflected by the reflective member.

12. A height adjustable seatpost comprising:

a first tube;

a second tube configured to telescopically received in the first tube;

an actuator being provided in at least one of the first tube and the second tube and configured to telescopically position the second tube relative to the first tube;

a support provided in the second tube and connected to the actuator to be moved by the actuator, the support being movable together with the second tube in a telescopic movement direction; and a non-contact detector provided inside the first tube and configured to detect a distance between the support and the non-contact detector in the telescopic movement direction, the distance corresponding to a position of the second tube relative to the first tube, the non-contact detector including:

a transmitter to transmit a detecting signal, and a receiver to receive the detecting signal that is reflected by the support.

\* \* \* \* \*